United States Patent
Guénanten et al.

(10) Patent No.: US 10,611,130 B2
(45) Date of Patent: Apr. 7, 2020

(54) EXTRUDED MATT FOIL WITH IMPROVED MECHANICAL PROPERTIES AND A HIGH WEATHERING RESISTANCE

(71) Applicant: Röhm GmbH, Darmstadt (DE)

(72) Inventors: Claude Guénanten, Darmstadt (DE); Helmut Háring, Otzberg (DE); Detlef Birth, Dieburg (DE); Max Conrad, Solingen (DE); Eric Reinheimer, Gross-Zimmern (DE); Günther Dickhaut, Mannheim (DE); Ghirmay Seyoum, Egelsbach (DE); Wangelis Karampougioukis, Darmstadt (DE); Girolamo Musci, Frankenthal (DE)

(73) Assignee: Röhm GmbH, Darmstadt (DE)

(*) Notice: Subject to any disclaimer, the term of this patent is extended or adjusted under 35 U.S.C. 154(b) by 0 days.

(21) Appl. No.: 16/466,069

(22) PCT Filed: Dec. 5, 2017

(86) PCT No.: PCT/EP2017/081497
§ 371 (c)(1),
(2) Date: Jun. 3, 2019

(87) PCT Pub. No.: WO2018/104293
PCT Pub. Date: Jun. 14, 2018

(65) Prior Publication Data
US 2019/0358940 A1 Nov. 28, 2019

(30) Foreign Application Priority Data
Dec. 7, 2016 (EP) .................................... 16202585

(51) Int. Cl.
*B32B 7/12* (2006.01)
*B32B 27/08* (2006.01)
(Continued)

(52) U.S. Cl.
CPC .............. *B32B 27/08* (2013.01); *B32B 7/12* (2013.01); *B32B 27/18* (2013.01); *B32B 27/308* (2013.01);
(Continued)

(58) Field of Classification Search
CPC .......... B32B 2250/24; B32B 2264/101; B32B 2307/71; B32B 2307/712; B32B 27/08;
(Continued)

(56) References Cited

U.S. PATENT DOCUMENTS

| 4,513,118 A | 4/1985 | Suetterlin et al. |
| 6,444,311 B1 | 9/2002 | Friedman et al. |

(Continued)

FOREIGN PATENT DOCUMENTS

| CA | 2 950 336 | 12/2015 |
| EP | 2 756 950 | 7/2014 |

(Continued)

OTHER PUBLICATIONS

International Search Report dated Feb. 13, 2018 in PCT/EP2017/081497.
(Continued)

*Primary Examiner* — Lawrence D Ferguson
(74) *Attorney, Agent, or Firm* — Grüneberg and Myers PLLC (57) ABSTRACT

An extruded matt foil has at least one layer in which glass beads are uniformly distributed in a polymer matrix with at least one fluoropolymer and at least one further layer. The matt foil has a particularly high UV-resistance, a high weathering resistance and excellent mechanical properties. Therefore, the foil is highly suitable for surface-protection of materials such as polyvinyl chloride (PVC) and for use in high-pressure laminates (HPLs).

19 Claims, 2 Drawing Sheets

(51) Int. Cl.
    *B32B 27/18*     (2006.01)
    *B32B 27/30*     (2006.01)
    *B32B 37/10*     (2006.01)
    *C08K 7/20*     (2006.01)
    *C08L 33/12*     (2006.01)

(52) U.S. Cl.
    CPC ............. *B32B 37/10* (2013.01); *C08K 7/20* (2013.01); *C08L 33/12* (2013.01); *B32B 2250/24* (2013.01); *B32B 2264/101* (2013.01); *B32B 2307/71* (2013.01); *B32B 2307/712* (2013.01)

(58) Field of Classification Search
    CPC ....... B32B 27/18; B32B 27/308; B32B 37/10; B32B 7/12; C08K 7/20; C08L 33/12
    See application file for complete search history.

(56) References Cited

U.S. PATENT DOCUMENTS

| | | | |
|---|---|---|---|
| 7,183,001 B1 | 2/2007 | Edderle et al. | |
| 7,754,317 B2 | 7/2010 | Neuhaeuser et al. | |
| 8,088,847 B2 | 1/2012 | Numrich et al. | |
| 2002/0127457 A1* | 9/2002 | Trapp | H01M 8/0226 429/518 |
| 2006/0228092 A1* | 10/2006 | Hebrink | B32B 3/26 385/147 |
| 2007/0012351 A1 | 1/2007 | Horemans | |
| 2007/0197703 A1 | 8/2007 | Neuhäuser et al. | |
| 2008/0281023 A1 | 11/2008 | Numrich et al. | |
| 2008/0311406 A1 | 12/2008 | Bonnet et al. | |
| 2010/0189983 A1 | 7/2010 | Numrich et al. | |
| 2013/0136910 A1 | 5/2013 | Numrich et al. | |
| 2013/0306127 A1 | 11/2013 | Ackermann et al. | |
| 2014/0342162 A1 | 11/2014 | Sanefuji et al. | |
| 2015/0044441 A1 | 2/2015 | Guenanten et al. | |
| 2017/0197391 A1 | 7/2017 | Parusel et al. | |

FOREIGN PATENT DOCUMENTS

| | | |
|---|---|---|
| GB | 1 205 268 | 9/1970 |
| GB | 1 486 638 | 9/1977 |
| JE | H4-11672 | 1/1992 |
| JP | H4-173843 | 6/1992 |
| JP | H5-220449 | 8/1993 |
| JP | H8-183925 | 7/1996 |
| JP | H9-221622 | 8/1997 |
| JP | 3123380 | 10/2000 |
| JP | 3293870 | 4/2002 |
| JP | 2013-199983 | 10/2013 |
| SU | 605531 | 4/1978 |
| TW | 201609388 | 3/2016 |
| WO | 2009/000566 | 12/2008 |
| WO | 2013/146104 | 10/2013 |

OTHER PUBLICATIONS

Written Opinion dated Feb. 13, 2018 in PCT/EP2017/081497.
U.S. Appl. No. 12/665,503, filed Dec. 18, 2009, 2010/0189983, Numrich et al.
U.S. Appl. No. 13/749,170, filed Jan. 24, 2013, 2013/0136910, Numrich et al.
U.S. Appl. No. 15/313,987, filed Nov. 25, 2016, 2017/0197391, Parusel et al.

* cited by examiner

EXTRUDED MATT FOIL WITH IMPROVED MECHANICAL PROPERTIES AND A HIGH WEATHERING RESISTANCE

This application is a National Stage entry under § 371 of International Application No. PCT/EP2017/081497, filed on Dec. 5, 2017, and which claims the benefit of European Application No. 16202585.2, filed on Dec. 7, 2016.

FIELD OF THE INVENTION

The present invention relates to an extruded matt foil comprising at least one layer in which glass beads are uniformly distributed in a polymer matrix comprising at least one fluoropolymer and at least one further layer. The matt foil has a particularly high UV-resistance, a high weathering resistance and excellent mechanical properties. Therefore, the foil of the present invention is highly suitable for surface-protection of materials such as polyvinyl chloride (PVC) and for use in high-pressure laminates (HPLs).

PRIOR ART

Foils of fluoropolymers such as polyvinylidene fluoride (PVDF) have an excellent UV- and moisture resistance and provide protection against chemicals, atmospheric agents, mechanical damage, fungi, dust and graffiti. Commonly, such foils include an additional layer of polymethyl(meth)acrylate (PMMA) comprising UV-absorbers and UV-stabilizers which is located beneath the PVDF layer. Such multi-layer foils offer an excellent protection against solar UV radiation and weathering and are commonly used for lamination of UV-sensitive substrates.

WO 2009/000566 A1 describes a PMMA/PVDF foil having an excellent weathering resistance and high UV-protective action. This foil encompasses PVDF and PMMA in a ratio of from 1:0.01 to 1:1 (w/w) and a mixture composed of UV-stabilisers and UV-absorbers.

Patent application US 2008/0311406 A1 describes a coextruded multilayer foil comprising:
a surface layer with PVDF and optionally PMMA;
an intermediate layer comprising PVDF and PMMA; and
an adhesive layer comprising a functional PMMA.
The application describes use of the foil as a protective layer for (ligno)cellulose material plates.

EP 2 756 950 A1 discloses a laminated foil comprising a layer of a polymer blend of PVDF and an acrylic resin and a further layer of an acrylic resin composition. The application explicitly states that the corresponding laminated foil has a glossy appearance.

OBJECT OF THE INVENTION

Due to inherent glossiness of the outer PVDF-layer, PVDF-based foils commonly have a glossy appearance. Although such glossy appearance is considered aesthetically appealing for many purposes, it becomes disadvantageous in cases, where a matt look is desired. Such applications include coatings for various construction applications such as high pressure laminates (HPLs), window profiles, doors and garage doors.

A common technique for rendering a PVDF-based foil matt is mechanical structuring of its outer surface, which may be carried out during manufacturing or lamination, for instance by thermal embossing. However, when such structured foil is applied onto a substrate or during a later long-term use of such foil, the structured surface of the foil may easily become extended, compressed or bent. Under these circumstances, the structuring on the surface may, at least to some extent, become lost and the affected areas appear glossy.

Additionally, the degree of undesired glossiness of these structured foils can easily be influenced depending on many factors such as temperature during the processing, surface material of the rolls etc. This renders the final appearance of the material covered by such foils highly irreproducible and substantially unpredictable. For instance, when such foils are used for lamination of a substrate, the final appearance of the resulting laminated material is strongly dependent on various process conditions, which is highly undesirable.

To avoid fluctuations of the appearance of the final product, the PVDF-based foils with a structured surface typically need to be used upon using exactly the same equipment and handled within a well-defined narrow temperature range. This renders manufacturing and handling of the materials laminated with the corresponding PVDF-based foils particularly cost-inefficient.

Use of uniformly dispersed particles such as glass beads in PMMA-sheets has been known for some time. For instance, U.S. Pat. No. 7,183,001 B1 describes a thermoplastic composition for fashioned light-scattering articles comprising a transparent thermoplastic made from a (meth)acrylic copolymer; and particles of hollow glass spheres, or a mixture of particles of hollow glass spheres and particles of a mineral and/or organic compound acting as light-scattering particles.

Furthermore, several applications (cf. e.g. JP H08-183925 A, JP H04-11672, GB 1205268 A etc.) describe fluoropolymer-based suspensions comprising glass beads. Such suspensions can be used for creating anti-adhesion coatings on metal substrates and are, for instance, commonly used for coating frying pans. These coatings are distinguishable from co-extruded foils inter alia in that there is no orientation of polymer chains in coatings formed from a suspension. In contrast thereto, extruded foils comprise oriented polymer chains.

However, glass beads have never been employed in a fluoropolymer-based polymer matrix of coextruded multi-layer foils.

JP H4-173843 describes an extruded monolayer film prepared from a composition comprising PVDF, an acrylic resin and glass beads. The film can be bonded to a metallic substrate by means of an adhesive which may contain an acrylic resin, an epoxy resin or a fluororesin, preferably a combination thereof.

Notwithstanding the above, fluoropolymers are known to be highly hydrophobic and to have a low adhesion to inorganic materials with a hydrophilic surface such as glass. As a result of an expectedly poor adhesion between the inorganic material particles and the fluoropolymer matrix the mechanical properties of the entire system have been expected to be rather moderate, in particular when the inorganic materials particles are substantially spherical.

Additionally, it has further been commonly believed that the surface of glass beads can act as a catalyst for decomposition of the fluoropolymer material at increased temperatures, which are required for thermoplastic processing of the fluoropolymer material. Such thermal decomposition is known to release highly toxic and corrosive hydrogen fluoride. For instance, material safety data sheets for common commercially available fluoropolymers such as T850 PVDF from Kurea or Hylar® 9009 PVDF from Solvay expressly point out that incorporation of glass into the PVDF matrix must be avoided for this reason.

Incorporation of hydrophobic scattering particles of a polymer such as silicone, PMMA or cross-linked polystyrene in a matrix of fluoropolymers of co-extruded multilayer film has not been practised either. PMMA particles have not been used due to a common believe that the chemical resistance of the resulting fluoropolymer foil would be significantly lower than that of an unmodified fluoropolymer foil. Use of silicone particles such as Tospearl® 120 in a fluoropolymer matrix has also been avoided because the adhesion between such particles and the fluoropolymer has been expected to be poor. Additionally, the presence of silicone particles in an outer layer of a foil can render said foil unsuitable for printing applications, even if the printed pattern and the silicone particles are located on the opposite sides of the foil.

In view of the above, the object addressed by the present invention was to provide a fluoropolymer-based foil having a long-term uniform matt appearance which does not get affected or even lost during subsequent handling of the foil, in particular at increased temperatures and/or mechanical pressures. In particular, it is important that the desired foil can be used for lamination process to obtain a material having a substantially uniform appearance, regardless the processing temperature and the material or the processing tools such as lamination rolls.

In contrast to the mechanically textured foils of the prior art, such foil should also remain uniformly matt upon applications in which it is bended, stretched and subjected to external mechanical pressure or is handled at fluctuating temperatures. Furthermore, such foil should offer advantages provided by fluoropolymer foils of the prior art, in particular an excellent chemical resistance against chemicals, humidity and UV radiation and a good mechanical stability.

SUMMARY OF THE INVENTION

The present invention is based on a surprising finding that a substantially uniform incorporation of glass particles such as glass beads into a fluoropolymer layer of a coextruded multilayer foil, yields a foil with outstanding mechanical properties and a very high resistance against weathering, chemicals and high temperatures. Additionally, and even more importantly, such foil can be employed in a lamination process without any significant glossiness appearance to deliver a laminated material having a particularly uniform appearance. In particular, the appearance of the final laminated material does not depend on factors such as lamination temperature and the processing equipment.

In its first aspect, the present invention is directed to a coextruded multilayer foil comprising at least a layer A and a layer B, wherein the layer A comprises, based on the total weight of the layer A:
from 40.0 to 97.0 wt.-% of a fluoropolymer;
from 0.0 to 45.0 wt.-% of a polyalkyl(meth)acrylate; and
from 3.0 to 30.0 wt.-% of glass beads;
and the layer B comprises, based on the total weight of the layer B:
from 0.0 to 100.0 wt.-% of a poly(methyl)methacrylate;
from 0.0 to 95.0 wt.-% of one or several impact modifiers;
from 0.0 to 40.0 wt.-% of a fluoropolymer;
from 0.0 to 5.0 wt.-% of one or several UV-absorbers;
from 0.0 to 5.0 wt.-% of one or several UV-stabilizers; and
from 0.0 to 20.0 wt.-% of an adhesion-promoting copolymer comprising (i) from 70.0 to 95.0 wt.-% methyl methacrylate;
(ii) from 0.5 to 15.0 wt.-% maleic anhydride; and
(iii) from 0.0 to 25.0 wt.-% of other vinyl-copolymerizable monomers having no functional groups other than the vinyl function, based on the weight of the adhesion-promoting copolymer; and
wherein the cumulative content of the poly(methyl)methacrylate and of one or several impact modifiers in the layer B is at least 50 wt.-%, preferably at least 60 wt.-%, more preferably at least 70 wt.-%, yet even more preferably at least 80 wt.-%, still more preferably at least 90 wt.-%, particularly preferably at least 95 wt.-%, based on the weight of the layer B.

As will be readily appreciated by a skilled person, the term "foil" as used herein, refers to a sheet having a thickness below 5 mm, more preferably, below 1 mm. Although the foil of the present invention can be advantageously used as a protective coating, the term "foil" as used in the present application should be generally distinguished from the term "coating". A coating is typically a top layer of a multi-layer substrate and cannot be handled separately from said substrate. In contrast to a coating, the foil of the present invention is not necessarily a layer of a multi-layer article i.e. is not necessarily attached to any substrate and can therefore be separately handled and used for a variety of different purposes.

The matte effect is produced by the glass beads on the surface of the foil, with, in a preferred embodiment, the glass beads actually projecting out (protruding) from the foil surface. Thus, the glass beads provide diffuse light dispersion which substantially reduces reflection of the light and thereby reduces glossiness.

The inventors found that during the lamination process, even at temperatures as high as 120° C. or even higher the foil of the present invention remains uniformly matt and the mechanical pressure of the laminating roll does not cause the glass beads to "sink" into the foil material. Instead, the glass beads remain visible on the surface of the resulting laminated article and ensure its uniform matt appearance. Also the surface roughness remains substantially unchanged. This observation is highly surprising because, according to a common believe, a poor adhesion between the highly hydrophobic fluoropolymer matrix and hydrophilic glass beads was expected to result in a system with poor mechanical properties.

The term "uniform" as used herein means that the concentration of the glass beads within the foil is substantially constant.

Finally, the finding that the material of the present invention has an excellent thermal resistance stands in contrast to a common technical prejudice that the surface of inorganic materials such as glass acts as a catalyst at high temperatures thereby decomposing the material of the matrix.

The foil of the present invention comprises at least a layer A and a layer B, wherein the layer A comprises, based on the total weight of the layer A:
from 40.0 to 97.0 wt.-% of a fluoropolymer;
from 0.0 to 45.0 wt.-% of a polyalkyl(meth)acrylate; and
from 3.0 to 30.0 wt.-% of glass beads;
and the layer B comprises, based on the total weight of the layer B:
from 0.0 to 100.0 wt.-% of a poly(methyl)methacrylate;
from 0.0 to 95.0 wt.-% of one or several impact modifiers;
from 0.0 to 40.0 wt.-% of a fluoropolymer;

from 0.0 to 5.0 wt.-% of one or several UV-absorbers;
from 0.0 to 5.0 wt.-% of one or several UV-stabilizers; and
from 0.0 to 20.0 wt.-% of an adhesion-promoting copolymer comprising
  (i) from 70.0 to 95.0 wt.-% methyl methacrylate;
  (ii) from 0.5 to 15.0 wt.-% maleic anhydride; and
  (iii) from 0.0 to 25.0 wt.-% of other vinyl-copolymerizable monomers having no functional groups other than the vinyl function, based on the weight of the adhesion-promoting copolymer; and
wherein the cumulative content of the poly(methyl)methacrylate and of one or several impact modifiers in the layer B is at least 50 wt.-%, preferably at least 60 wt.-%, more preferably at least 70 wt.-%, yet even more preferably at least 80 wt.-%, still more preferably at least 90 wt.-%, particularly preferably at least 95 wt.-%, based on the weight of the layer B.

The matt foil of the present invention is superior in terms of weathering resistance and mechanical resistance to the matt foils available on the market and has an improved stability over a prolonged period (>10 years=long-term stability). The term "stability" as used herein refers not only to the intrinsic stability of the foil with respect to weathering effects and mechanical damages but also to sustainability of its protective action.

Additionally, the matt foil of the present invention provides the following advantages:
  It can be employed for lamination of various substrates at varying temperatures and upon using different lamination equipment. The appearance of the resulting laminated product is highly uniform and substantially independent on the processing conditions such as lamination temperature or material of the lamination rolls.
  It has an excellent weathering resistance and a very good chemicals resistance, for example with respect to commercially available cleaning compositions.
  It is substantially impermeable to water vapour i.e. its water vapour transmission rate corresponds to that of an unmodified PVDF foil.
  It has dirt-repellent properties, to ease cleaning.
  It remains uniformly matt over a prolonged period.
  It can be manufactured in an extrusion plant in a cost-effective manner.

Since the material used in the present invention has an excellent thermal stability, it is highly suitable for thermal plastic processing such as extrusion, injection moulding or for foil-moulding processes such as a chill-roll process.

In its further aspect, the invention is directed to a process for the manufacturing of the foil, wherein the process comprises a step in which the foil is moulded in a foil-moulding process, preferably in chill-roll process from a composition comprising:
  from 40.0 to 97.0 wt.-% of a fluoropolymer;
  from 0.0 to 45.0 wt.-% of a polyalkyl(meth)acrylate; and
  from 3.0 to 30.0 wt.-% of glass beads, based on the total weight of the composition.

In yet a further aspect, the invention is directed to a multi-layer article, preferably a high-pressure laminate, comprising a substrate which is at least partially covered by the foil, wherein
  the layer A forms an outer surface of the multi-layer article;
  the layer B is located between the layer A and the substrate; and
  the layer C, if present, is located between the layer B and the substrate.

A further aspect of the present invention relates to process for the manufacturing of the foil, wherein the process comprises a step in which the foil is moulded in a foil-moulding process, preferably in chill-roll process from a composition comprising:
  from 40.0 to 97.0 wt.-% of a fluoropolymer;
  from 0.0 to 45.0 wt.-% of a polyalkyl(meth)acrylate; and
  from 3.0 to 30.0 wt.-% of glass beads, based on the total weight of the composition.

Yet a further aspect of the present invention relates to a multi-layer article comprising a substrate at least partially covered by the foil of the present invention. The foil of the present invention has an excellent weathering stability and mechanical properties and, if applied as a coating on an article, can protect said article against scratches, chemicals, humidity and solar UV radiation. As a consequence, the resulting article is highly suitable for use in environments, where it is exposed to these factors, for instance for an outdoor use.

Hence, the gist of the present invention can be summarized as follows:

{1} A coextruded multilayer foil comprising at least a layer A and a layer B, wherein the layer A comprises, based on the total weight of the layer A:
  from 40.0 to 97.0 wt.-% of a fluoropolymer;
  from 0.0 to 45.0 wt.-% of a polyalkyl(meth)acrylate; and
  from 3.0 to 30.0 wt.-% of glass beads;
and the layer B comprises, based on the total weight of the layer B:
  from 0.0 to 100.0 wt.-% of a poly(methyl)methacrylate;
  from 0.0 to 95.0 wt.-% of one or several impact modifiers;
  from 0.0 to 40.0 wt.-% of a fluoropolymer;
  from 0.0 to 5.0 wt.-% of one or several UV-absorbers;
  from 0.0 to 5.0 wt.-% of one or several UV-stabilizers; and
  from 0.0 to 20.0 wt.-% of an adhesion-promoting copolymer comprising
    (i) from 70.0 to 95.0 wt.-% methyl methacrylate;
    (ii) from 0.5 to 15.0 wt.-% maleic anhydride; and
    (iii) from 0.0 to 25.0 wt.-% of other vinyl-copolymerizable monomers having no functional groups other than the vinyl function, based on the weight of the adhesion-promoting copolymer; and
wherein the cumulative content of the poly(methyl)methacrylate and of one or several impact modifiers in the layer B is at least 50 wt.-%, preferably at least 60 wt.-%, more preferably at least 70 wt.-%, yet even more preferably at least 80 wt.-%, still more preferably at least 90 wt.-%, particularly preferably at least 95 wt.-%, based on the weight of the layer B.

{2} Foil according to Item {1}, wherein the layer A comprises:
  from 85.0 to 97.0 wt.-% of the fluoropolymer;
  0.0 wt.-% of the polyalkyl(meth)acrylate; and
  from 3.0 to 15.0 wt.-% of glass beads, based on the total weight of the layer A.

{3} Foil according to Item {1} or {2}, wherein the fluoropolymer is selected from polyvinylidene fluoride (PVDF), polyvinylfluoride (PVF), polytetrafluoroethylene (PTFE), polyethylenetetrafluoroethylene (ETFE), fluorinated ethylene-propylene (FEP) or a mixture thereof.

{4} Foil according to any of Items {1} to {3}, wherein the fluoropolymer is a predominantly amorphous polyvinylidenfluorid or a microcrystalline polyvinylidenfluorid, preferably having a molecular weight Mw from 50 000 to 300 000 g/mol, determined by GPC.

{5} Foil according to any of Items {1} to {4}, wherein the glass beads are substantially spherical and have an average diameter from 2.0 μm to 30.0 μm, preferably from 5.0 μm to 20.0 μm.

{6} Foil according to any of Items {1} to {5}, wherein the polyalkyl(meth)acrylate is polymethyl methacrylate having an average molar weight Mw of from 80 000 g/mol to 180 000 g/mol and is obtainable by polymerization of a composition whose polymerizable constituents comprise, based on the weight of the polymerisable composition:
(a) from 50.0 to 99.9 wt.-% of methyl methacrylate,
(b) from 0.1 to 50.0 wt.-% of an acrylic acid ester of a C1-C4 alcohol,
(c) from 0.0 to 10.0 wt.-% of at least one further monomer copolymerizable with the monomers (a) and (b).

{7} Foil according to any of Items {1} to {6}, wherein at least 20 wt-%, more preferably at least 40 wt-%, even more preferably at least 60 wt-%, yet even more preferably at least 80 wt-% of the glass beads, based on the weight of the employed glass beads, have a diameter which is higher than the average thickness of the layer A.

{8} Foil according to any of Items {1} to {7}, wherein the layer B comprises:
from 0.5 to 4.0 wt.-% of a benzotriazole type compound as a first UV absorber;
from 0.5 to 3.0 wt.-% of a triazine type compound as a second UV absorber; and
from 0.2 to 2.0 wt.-% of a HALS type compound as a UV stabilizer, based on the total weight of the layer B.

{9} Foil according to any of Items {1} to {8}, wherein the foil further comprising an adhesion-promoting layer C, wherein the layer B is located between the layer A and the layer C, and the layer C comprises an adhesion-promoting copolymer comprising:
(i) from 70.0 to 95.0 wt.-% methyl methacrylate;
(ii) from 0.5 to 15.0 wt.-% maleic anhydride; and
(iii) from 0.0 to 25.0 wt.-% of other vinyl-copolymerizable monomers having no functional groups other than the vinyl function, based on the weight of the adhesion-promoting copolymer.

{10} Foil according to any of Items {1} to {9}, wherein the layer A has a thickness from 1.0 μm to 30.0 μm; and the layer B has a thickness from 15.0 μm to 150.0 μm.

{11} Process for the manufacturing of the foil according to any of Items {1} to {10}, wherein the process comprises a step in which the foil is moulded in a foil-moulding process, preferably in chill-roll process from a composition comprising:
from 40.0 to 97.0 wt.-% of a fluoropolymer;
from 0.0 to 45.0 wt.-% of a polyalkyl(meth)acrylate; and
from 3.0 to 30.0 wt.-% of glass beads, based on the total weight of the composition.

{12} A multi-layer article, preferably a high-pressure laminate, comprising a substrate which is at least partially covered by a foil according to any of Items {1} to {10}, wherein
the layer A forms an outer surface of the multi-layer article;
the layer B is located between the layer A and the substrate; and
the layer C, if present, is located between the layer B and the substrate.

{13} The multi-layer article according to Item {12}, wherein
the layer B is adjacent to the layer A, and
the layer C, if present, is adjacent to the layer B.

{14} Process for manufacturing of a multi-layer article according to Item {12} or {13}, the process comprising a step of coating a substrate with a foil according to any of Items {1} to {10} by means of co-extrusion, lamination or extrusion lamination.

{15} Process according to Item {14}, wherein the multi-layer article is a high-pressure laminate and the step of coating a substrate with a foil according to any of Items {1} to {10} is carried out at a pressure of not lower than 1 MPa, preferably of not lower than 4 MPa, more preferably not lower than 6 MPa and a temperature of not lower that 120° C.

DETAILED DESCRIPTION OF THE PREFERRED EMBODIMENTS

The foil of the present invention comprises a fluoropolymer-based layer A in which glass beads are substantially uniformly dispersed in a polymer matrix. In one embodiment, the polymer matrix comprises a combination of a fluoropolymer e.g. PVDF and at least one further polymer such as polyalky(meth)acrylate such as PMMA. In this embodiment, the content of the fluoropolymer is typically from 40.0 to 97.0 wt.-% and the content of the polyalky (meth)acrylate is from 0.0 to 45.0 wt.-%, based on the total weight of the layer A. This corresponds to the weight ratio fluoropolymer:polyalkyl(meth)acrylate from about 1:1 to about 1:0. As will be readily appreciated by a skilled person, the exact composition of the polymer matrix in the layer A can be adjusted depending on the intended use of the foil. A particularly weathering-resistant foil can be obtained by using the combination of PMMA/PVDF if the weight ratio of PVDF and PMMA is from 1.0:0.01 to 1:1 (w/w), more preferably from 1.0:0.15 to 1.0:0.40 (w/w), the ratio from 1.0:0.15 to 1.0:0.30 (w/w) being particularly preferable.

Glass Beads

Depending on the desired degree of glossiness of the foil, the content of the glass beads dispersed in the polymeric matrix is usually from 3.0 to 30.0 wt.-%, more preferred from 5.0 to 20.0 wt.-%, and particularly preferred from 10.0 to 15.0 wt.-%, based on the total weight of the layer A.

The glass beads may have an aspect ratio of at least about 4:1, more preferably at least about 2:1. Ideally, the glass beads are substantially spherical i.e. have an aspect ratio of about 1:1.

The glass beads advantageously have a narrow size distribution. The size distribution may be measured by conventional apparatus such as a Malvern particle size analyzer e.g. by Mastersizer 2000. Typically, the glass beads are solid (i.e. non-hollow) glass beads, are not limited to any chemical composition and can have either a smooth surface or an etched surface. The surface etching can be conveniently performed by contacting the glass beads with nitric acid for a time sufficient to give the desired degree of etching of the surface. For achieving an optimal adhesion between the glass beads and the fluoropolymer-based matrix, the glass beads may also have a siloxane layer.

Depending on the desired optical properties of the foil and the desired surface roughness, the size of the glass beads (average diameter, weight averaged) is typically chosen to be from 2.0 µm to 30.0 µm, preferably from 5.0 µm to 20.0 µm, even more preferably from 8.0 µm to 15.0 µm.

Typically, if glass beads with an average diameter below 2.0 µm are used, the surface of the resulting foil no longer appears matt. On the other hand, use of glass beads having an average diameter above 30.0 µm leads to a relatively high surface roughness, which is undesirable for many applications.

The size of the glass beads—indicated as so-called $d_{50}$-value (that is 50 percent by volume of the particles have a particle size below the specified average particle size) can be measured in accordance with the standard norm for laser diffraction measurements ISO 13320 (2009). Typically, the size of the glass beads is determined in each case (at a dispersion of the particles in butyl acetate refractive index: 1,462) by laser light scattering (at room temperature 23° C.) using a Malvern Mastersizer 2000 from Malvern Instruments with the mini-dispersing MS1 at 2000 revolutions per minute and evaluation by Fraunhofer. A further equally suitable instrument for this purpose is Beckman Coulter LS 13 320 laser diffraction particle size analyser.

The inventors found that the foil of the present invention as well as the substrate laminated using said foil show a particularly uniform matte appearance if at least 20 wt-%, more preferably at least 40 wt-%, even more preferably at least 60 wt-%, and in some cases even at least 80 wt-% of the glass beads, based on the weight of the employed glass beads, have a diameter which is higher than the average thickness of the layer A. Without wishing to be bound by theory, it appears that that the ability of glass beads to resist external mechanical pressure at increased temperatures during the lamination process, in such an embodiment, is particularly high.

The average thickness of the foil and the average thickness of individual layers are advantageously determined using photomicrographs obtained using a scanning electron microscope such as JEOL JSM-IT300 (commercially available from JEOL GmbH, Freising, Germany). A sample piece having a suitable size for the measurement can be obtained by freezing the foil in liquid nitrogen and mechanically breaking it. The freshly obtained fracture surface is photographed using the scanning electron microscope.

For the sake of achieving good mechanical properties of the foil, the glass beads are preferably non-hollow i.e. solid.

The refractive index of the glass beads, measured for the Na-D line (589 nm) at 20° C. is selected to differ from the refractive index of the polymeric material matrix in the fluoropolymer-based layer A by from 0.01 to 0.2 units.

The chemical composition of the glass beads is not particularly limited and substantially any commercially available sorts of glass can be employed. These include in particular fused silica glass, soda-lime-silica glass, sodium borosilicate glass, lead-oxide glass, aluminosilicate glass and oxide glass, wherein use of a soda-lime-silica glass is particularly preferred.

The refractive index of a soda-lime-silica glass is usually from 1.51 to 1.52. In a particularly preferred embodiment, the glass beads have the following composition:
from 70.0 to 75.0 wt. % $SiO_2$
from 12.0 to 15.0 wt. % $Na_2O$
from 0.0 to 1.5 wt. % $K_2O$
from 7.0 to 12.0 wt. % $CaO$
from 0.0 to 5.0 wt. % $MgO$
from 0.1 to 2.5 wt. % $Al_2O_3$
from 0.0 to 0.5 wt. % $Fe_2O_3$ Examples of suitable glass beads are Spheriglass® products such as Spheriglass® 7025 and Spheriglass® 5000 available from Potters Industries LLC. or Omicron® glass beads Omicron® NP3 and Omicron® NP5 obtainable from Sovitec Mondial S.A.

In some embodiments, the polymer matrix of the fluoropolymer-based layer A substantially consists of one or several fluoropolymers such as PVDF. In these embodiments, the content of the fluoropolymer(s) is typically from 85.0 to 97.0 wt.-%, more preferably from 88.0 to 95.0 wt.-% and particularly preferably from 90.0 wt.-% to 92.0 wt.-%, based on the total weight of the fluoropolymer-based layer A. Accordingly, the fluoropolymer-based layer A typically comprises from 4.0 to 15.0 wt.-%, preferably from 5.0 to 12.0 wt.-%, particularly preferably from 8.0 wt.-% to 10.0 wt.-% of glass beads, based on the total weight of the fluoropolymer-based layer A.

Fluoropolymer

Depending on the intended use of the foil of the present invention the fluoropolymer may be selected from polyvinylidene fluoride (PVDF), polyvinylfluoride (PVF), polytetrafluorethylene (PTFE), polyethylenetetrafluoroethylene (ETFE), fluorinated ethylene-propylene (FEP) or a mixture thereof.

The PVDF polymers used in the foil are generally transparent, semicrystalline, thermoplastic fluoroplastics. Advantageously, the PVDF has a high crystalline fusing point. The heat resistance of the foil is particularly high when, the crystalline fusing point of the PVDF is at least 150° C. and more preferably at least 160° C. The upper limit of the crystalline fusing point is preferably approximately 175° C., which is equal to the crystalline fusing point of PVDF. It is further preferred that the weight average molecular weight Mw of the PVDF ranges from 50 000 to 300 000 g/mol, more preferably from 80 000 to 250 000 g/mol, even more preferably from 150 000 to 250 000 g/mol as determined by GPC.

The fundamental unit for PVDF is vinylidene fluoride, which is polymerized by means of a specific catalyst to give PVDF in high-purity water under controlled conditions of pressure and of temperature. Vinylidene fluoride is obtainable by way of example from hydrogen fluoride and methylchloroform as starting materials, using chlorodifluoroethane as precursor. In principle, any commercial grade of PVDF such as Kynar® grades produced by Arkema, Dyneon® grades produced by Dyneon, or Solef® grades produced by Solvay is suitable for use in the present invention. For instance, the following commercial products may be employed: Kynar® 720 (vinylidene fluoride content: 100 wt.-%, crystalline fusing point: 169° C.) and Kynar® 710 (vinylidene fluoride content: 100 wt.-%, crystalline fusing point: 169° C.) manufactured by ARKEMA; T850 (vinylidene fluoride content: 100 wt.-%, crystalline fusing point: 173° C.) manufactured by KUREHA Corporation;

Solef® 1006 (vinylidene fluoride content: 100 wt.-%, crystalline fusing point: 174° C.) and Solef® 1008 (trade name) (vinylidene fluoride content: 100 wt.-%, crystalline fusing point: 174° C.) manufactured by Solvay Solexis.

PVDF has 3 linkage modes as linkage modes of monomer: head to head linkage; tail to tail linkage; and head to tail linkage, in which the head to head linkage and the tail to tail linkage are referred to as "hetero linkage". The chemical resistance of the layer A is particularly high when the "rate of hetero linkage" in the PVDF is not greater than 10 mol.-%. From the viewpoint of lowering the rate of hetero linkage, the PVDF is preferably a resin produced by suspension polymerization.

The rate of hetero linkage can be determined from a peak of a $^{19}$F-NMR spectrum of the PVDF as specified in EP 2 756 950 A1.

Typically, the fluoropolymer is not cross-linked and it therefore suitable for thermoplastic processing.

The PVDF may include a flatting agent to such a degree that the transparency of the layer A is not deteriorated. As the flatting agent, an organic flatting agent and an inorganic flatting agent can be used.

In one embodiment, the fluoropolymer is a predominantly amorphous, or a microcrystalline PVDF with a haze value smaller than 5. The haze value is measured for this purpose on a pure fluoropolymer (PVDF) foil of thickness 30 µm at 23° C. in accordance with ASTM D1003. Examples of types of PVDF having particularly good suitability with appropriately low haze value are Solef® 9009 from Solvay, T850 from Kureha and Kynar® 9000HD from Arkema.

Polyalkyl(meth)acrylate

As already mentioned above, the fluoropolymer-based layer A may further comprise up to 45 wt.-% of polyalkyl (meth)acrylate such as polymethyl(meth)acrylate (PMMA). PMMA is generally obtained by free-radical polymerization of mixtures which comprise methyl methacrylate. These mixtures generally comprise at least 40 wt.-%, preferably at least 60 wt.-%, particularly preferably at least 80 wt.-%, and even more preferably at least 90 wt.-%, based on the weight of the monomers, of methyl methacrylate.

These mixtures for production of PMMA can also comprise other (meth)acrylates copolymerizable with methyl methacrylate. The term "(meth)acrylate" as used herein is meant to encompass methacrylates, acrylates and mixtures thereof. (Meth)acrylates may derive from saturated alcohols, e.g. methyl acrylate, ethyl (meth)acrylate, propyl (meth) acrylate, n-butyl (meth)acrylate, tert-butyl (meth)acrylate, isobutyl (meth)acrylate, pentyl (meth)acrylate and 2-ethylhexyl (meth)acrylate; or from unsaturated alcohols, e.g. oleyl (meth)acrylate, 2-propynyl (meth)acrylate, allyl (meth)acrylate, vinyl (meth)acrylate; and also aryl (meth) acrylates, such as benzyl (meth)acrylate or phenyl (meth) acrylate, cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth) acrylate, 2-hydroxypropyl (meth)acrylate; glycol di(meth) acrylates, such as 1,4-butanediol (meth)acrylate, (meth) acrylates of ether alcohols, e.g. tetrahydrofurfuryl (meth) acrylate, vinyloxyethoxyethyl (meth)acrylate; amides and nitriles of (meth)acrylic acid, e.g. N-(3-dimethylaminopropyl)(meth)acrylamide, N-(diethylphosphono)-(meth)acrylamide, 1-methacryloylamido-2-methyl-2-propanol; sulphur-containing methacrylates, such as ethylsulphinylethyl (meth)acrylate, 4-thiocyanatobutyl (meth)acrylate, ethylsulphonylethyl (meth)acrylate, thiocyanatomethyl (meth)acrylate, methylsulphinylmethyl (meth)acrylate, bis((meth)acryloyloxyethyl) sulphide; polyfunctional (meth)acrylates, such as trimethyloylpropane tri(meth)acrylate.

The polymerization reaction is generally initiated by known free-radical initiators. Among the preferred initiators are inter alia the azo initiators well known to persons skilled in the art, e.g. AIBN and 1,1-azobiscyclohexanecarbonitrile, and peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another and mixtures of the abovementioned compounds with compounds that have not been mentioned but which can likewise form free radicals.

The compositions to be polymerized can comprise not only the (meth)acrylates described above but also other unsaturated monomers which are copolymerizable with methyl methacrylate and with the abovementioned (meth) acrylates. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl ethers and isoprenyl ethers; maleic acid derivatives, such as maleic anhydride, methylmaleic anhydride, maleimide, methylmaleimide; and dienes, such as divinylbenzene.

The amount of these comonomers generally used is from 0.0 wt.-% to 60.0 wt.-%, preferably from 0.0 to 40.0 wt.-% and particularly preferably from 0.0 to 20.0 wt.-%, based on the weight of monomers, and the compounds here can be used individually or in the form of a mixture.

Further preference is given to PMMA which is obtainable by polymerization of a composition having, as polymerizable constituents:
(a) from 50.0 to 99.9 wt.-% of methyl methacrylate,
(b) from 0.1 to 50.0 wt.-% of an acrylic acid ester of a C1-C4 alcohol,
(c) from 0.0 to 10.0 wt.-% of monomers co-polymerizable with the monomers (a) and (b).

Use of the component (c) in the range from 8.0 to 10.0 wt.-%, the component (c) being preferably n-butyl acrylate, raises the intrinsic stability of the foil. As the proportion of the component (c) increases, the stability of the foil increases. However, an increase beyond the limiting values is disadvantageous.

In yet a further embodiment preference is given to PMMA composed of from 85.0 to 99.5 wt. % of methyl methacrylate and from 0.5 to 15.0 wt.-% of methyl acrylate, the amounts here being based on 100 wt.-% of the polymerizable constituents. Particularly advantageous copolymers are those obtainable by copolymerization of from 90.0 to 99.5 wt.-% of methyl methacrylate and from 0.5 to 10.0 wt.-% of methyl acrylate, where the amounts are based on 100 wt.-% of the polymerizable constituents. For instance, the PMMA may comprise 91.0 wt.-% of methyl methacrylate and 9.0 wt.-% of methyl acrylate, 96.0 wt.-% of methyl methacrylate and 4.0 wt.-% of methyl acrylate or 99.0 wt.-% of methyl methacrylate and 1.0 wt.-% of methyl acrylate. The Vicat softening points VSP (ISO 306-B50) of said PMMA is typically at least 90° C., preferably from 95° C. to 112° C.

The chain lengths of the PMMA polymers can be adjusted by polymerization of the monomer mixture in the presence of molecular-weight regulators, particular examples being the mercaptans known for this purpose, e.g. n-butyl mercaptan, n-dodecyl mercaptan, 2-mercaptoethanol or 2-ethylhexyl thioglycolate, or pentaerythritol tetrathioglycolate; the amounts generally used of the molecular-weight regulators being from 0.05 to 5.0 wt.-%, based on the weight of the monomer mixture, preference being given to amounts of from 0.1 to 2.0% wt.-% and particular preference being given to amounts of from 0.2 to 1.0 wt.-%, based on the monomer mixture (cf. H. Rauch-Puntigam, Th. Völker, "Acryl- and Methacrylverbindungen" ["Acrylic and Methacrylic Compounds"], Springer, Heidelberg, 1967; Houben-Weyl, Methoden der organischen Chemie, [Methods of Organic Chemistry], Vol. XIV/1, page 66, Georg Thieme, Heidelberg, 1961, or Kirk-Othmer, Encyclopedia of Chemical Technology, Vol. 1, pages 296 et seq., J. Wiley, New York, 1978).

The weight-average molar mass Mw of the PMMA employed is usually above 80 000 g/mol, determined by means of gel permeation chromatography (GPC with reference to PMMA as a calibration standard, as for all of the Mw determinations on the matrix PMMA), more preferably ≥120 000 g/mol. For the purposes of the invention, it is possible to achieve foils of even greater weathering resistance if the weight-average molar mass Mw of PMMA is above 140 000 g/mol. The weight-average molar mass Mw of the PMMA is generally in the range from 80 000 g/mol to 300 000 g/mol. Particularly good weathering resistances are obtained from foils with PMMA having an average molar mass Mw in the range from 80 000 g/mol to 180 000 g/mol, preferably in the range from 100 000 g/mol to 180 000 g/mol, more preferably in the range from 120 000 g/mol to 180 000 g/mol, in each case determined by means of GPC against PMMA calibration standards.

Typically, the PMMA is not cross-linked and it therefore suitable for thermoplastic processing.

Figure 1:
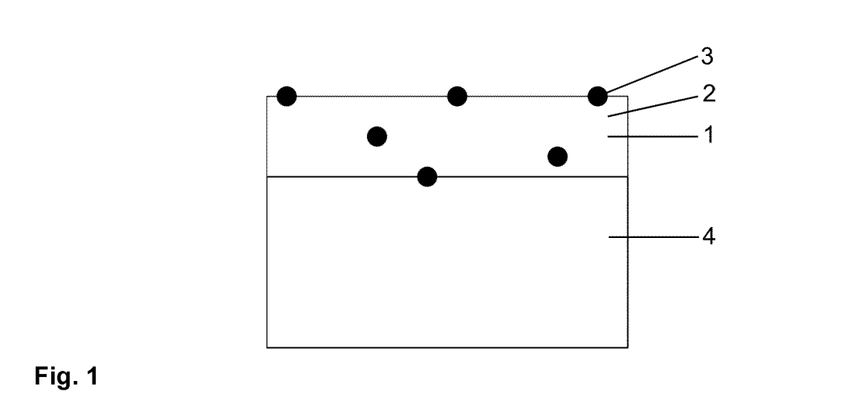
FIG. 1 is a schematic illustration of a matt foil of the present invention consisting of the fluoropolymer-based layer A and a PMMA-based layer B:
1. fluoropolymer-based layer A
2. fluoropolymer matrix
3. glass beads
4. PMMA-based layer B FIG. 2 schematically illustrates an embodiment of a matt foil comprising a fluoropolymer-based layer A, a PMMA-based layer B and an adhesion-promoting layer C:
1. fluoropolymer-based layer A
2. fluoropolymer matrix
3. glass beads
4. PMMA-based layer B
5. adhesion-promoting layer C FIG. 3 microphotograph of a matt foil of the present invention obtained with a scanning electron microscope. Magnification: 5000×, 10 kV, SED detector.

According to the present invention, the foil comprises at least the layer A and one further layer B (cf. FIG. 1). According to the present invention, the layer A is directly adjacent to the layer B. When the foil of the present invention is used for protection of an article, the fluoropolymer-based layer A forms an outer surface of said article thereby facing the environment. The layer B is located beneath the layer A i.e. closer to the surface of the article.

Although the layer B may also comprise at least one fluoropolymer such as PVDF, the composition of the layer B typically differs from the composition of the fluoropolymer-based layer A. In particular, the layer B is usually substantially free of glass beads and, even more preferably, substantially free of any scattering particles.

The composition of the layer B is as follows, based on the total weight of the layer B:

from 0.0 to 100.0 wt.-%, preferably from 10.0 to 90.0 wt.-% of a poly(methyl)methacrylate;

from 0.0 to 95.0 wt.-%, preferably from 10.0 to 90.0 wt.-% of one or several impact modifiers;

from 0.0 to 40.0 wt.-%, preferably from 10.0 to 30.0 wt.-% of a fluoropolymer;

from 0.0 to 5.0 wt.-%, preferably from 1.0 to 4.0 wt.-% of one or several UV-absorbers;

from 0.0 to 5.0 wt.-%, preferably from 0.5 to 3.0 wt.-% of one or several UV-stabilizers; and from 0.0 to 20.0 wt.-%, preferably from 0.0 to 10.0 wt.-% of an adhesion-promoting copolymer comprising (i) from 70.0 to 95.0 wt.-% methyl methacrylate;
(ii) from 0.5 to 15.0 wt.-% maleic anhydride; and
(iii) from 0.0 to 25.0 wt.-% of other vinyl-copolymerizable monomers having no functional groups other than the vinyl function, based on the weight of the copolymer.

The cumulative content of the poly(methyl)methacrylate and of one or several impact modifiers in the layer B is at least 50 wt.-%, preferably at least 60 wt.-%, more preferably at least 70 wt.-%, yet even more preferably at least 80 wt.-%, still more preferably at least 90 wt.-%, particularly preferably at least 95 wt.-%, based on the weight of the layer B.

For instance, the layer B may comprise from 10.0 to 90.0 wt.-% of a poly(methyl)methacrylate;

from 10.0 to 90.0 wt.-% of one or several impact modifiers;

from 0.0 to 5.0 wt.-%, preferably from 1.0 to 4.0 wt.-% of one or several UV-absorbers;

from 0.0 to 5.0 wt.-%, preferably from 0.5 to 3.0 wt.-% of one or several UV-stabilizers; and from 0.0 to 20.0 wt.-%, preferably from 0.0 to 10.0 wt.-% of an adhesion-promoting copolymer comprising (i) from 70.0 to 95.0 wt.-% methyl methacrylate;
(ii) from 0.5 to 15.0 wt.-% maleic anhydride; and
(iii) from 0.0 to 25.0 wt.-% of other vinyl-copolymerizable monomers having no functional groups other than the vinyl function, based on the weight of the copolymer.

Preferably, the polyalkyl(meth)acrylate in the layer B is PMMA as described above and the fluoropolymer is PVDF described above.

Impact Modifiers

Impact modifiers for use in the present invention per se are well known and may have different chemical compositions and different polymer architectures. The impact modifiers may be crosslinked or thermoplastic. In addition, the impact modifiers may be in particulate form, as core-shell or as core-shell-shell particles. Typically, particulate impact modifiers have an average particle diameter between 20 and 400 nm, preferably between 50 and 300 nm, more preferably between 100 and 285 nm and most preferably between 150 and 270 nm. "Particulate" in this context means crosslinked impact modifiers which generally have a core-shell or a core-shell-shell structure.

In the simplest case, the particulate impact modifiers are crosslinked particles obtained by means of emulsion polymerization whose average particle size is in the range from 10 to 150 nm, preferably from 20 to 100 nm, in particular from 30 to 90 nm. These are generally composed of at least 40.0 wt.-%, preferably from 50.0 to 70.0 wt.-% of methyl methacrylate, from 20.0 to 40.0 wt.-%, preferably from 25.0 to 35.0 wt.-% of butyl acrylate, and from 0.1 to 2.0 wt.-%, preferably from 0.5 to 1.0 wt.-% of a crosslinking monomer, e.g. a polyfunctional (meth)acrylate, e.g. allyl methacrylate and, if appropriate, other monomers, e.g. from 0.0 to 10.0 wt.-%, preferably from 0.5 to 5.0% wt.-%, of $C_1$-$C_4$-alkyl methacrylates, such as ethyl acrylate or butyl methacrylate, preferably methyl acrylate, or other vinylically polymerizable monomers, e.g. styrene.

Preferred impact modifiers are polymer particles which can have a two- or three-layer core-shell structure and are obtained by emulsion polymerization (see, for example, EP-A 0 113 924, EP-A 0 522 351, EP-A 0 465 049 and EP-A 0 683 028). The present invention typically requires suitable particle sizes of these emulsion polymers in the range from 10 to 150 nm, preferably from 20 to 120 nm, particularly preferably from 50 to 100 nm.

A three-layer or three-phase structure with a core and two shells can prepared as follows. The innermost (hard) shell can, for example, be composed in essence of methyl methacrylate, of small proportions of comonomers, e.g. ethyl acrylate, and of a proportion of crosslinking agent, e.g. allyl methacrylate. The middle (soft) shell can, for example, be composed of butyl acrylate and, if appropriate, styrene, while the outermost (hard) shell is in essence the same as the matrix polymer, thus bringing about compatibility and good linkage to the matrix. The proportion of polybutyl acrylate in the impact modifier is decisive for the impact-modifying action and is preferably in the range from 20.0 to 40.0 wt.-%, particularly preferably in the range from 25.0 to 35.0 wt.-%.

A further preference is given, in particular for foil production, but not restricted thereto, to use of a system known in principle from EP 0 528 196 A1 which is a two-phase impact-modified polymer composed of:

a1) from 10.0 to 95.0 wt.-% of a coherent hard phase whose glass transition temperature Tg is above 70° C., composed of a11) from 80.0 to 100 wt.-% (based on a1) of methyl methacrylate and a12) from 0.0 wt.-% to 20.0 wt.-% of one or more other ethylenically unsaturated monomers capable of free-radical polymerization, and a2) from 90.0 to 5.0 wt.-% of a tough phase whose glass transition temperature Tg is below −10° C., distributed in the hard phase and composed of a21) from 50.0 to 99.5 wt.-% of a $C_1$-$C_{10}$-alkyl acrylate (based on a2)

a22) from 0.5 to 5.0 wt.-% of a crosslinking monomer having two or more ethylenically unsaturated radicals which are capable of free-radical polymerization, and a23) if appropriate, other ethylenically unsaturated monomers capable of free-radical polymerization, where at least 15.0 wt.-% of the hard phase a1) has a covalent linkage to the tough phase a2).

The two-phase impact modifier can be produced by a two-stage emulsion polymerization reaction in water, as described by way of example in DE-A 38 42 796. In the first stage, the tough phase a2) is produced and is composed of at least 50.0 wt.-%, preferably more than 80.0 wt.-%, of lower alkyl acrylates, thus giving a glass transition temperature Tg below −10° C. for this phase. Crosslinking monomers a22) used comprise (meth)acrylates of diols, e.g. ethylene glycol dimethacrylate or 1,4-butanediol dimethacrylate, aromatic compounds having two vinyl or allyl groups, e.g. divinylbenzene, or other crosslinking agents having two ethylenically unsaturated radicals which are capable of free-radical polymerization, e.g. allyl methacrylate, as graft-linking agent. Crosslinking agents that may be mentioned by way of example and have three or more unsaturated groups which are capable of free-radical polymerization, e.g. allyl groups or (meth)acrylic groups, are triallyl cyanurate, trimethylolpropane triacrylate and trimethylolpropane tri(meth)acrylate, and pentaerythrityl tetraacrylate and pentaerythrityl tetra(meth)acrylate. U.S. Pat. No. 4,513,118 gives further examples thereof.

The ethylenically unsaturated monomers capable of free-radical polymerization and mentioned under a23) can, by way of example, be acrylic or methacrylic acid or else their alkyl esters having from 1 to 20 carbon atoms but not mentioned above, and the alkyl radical here can be linear, branched or cyclic. Furthermore, a23) can comprise further aliphatic comonomers which are capable of free-radical polymerization and which are copolymerizable with the alkyl acrylates a21). However, the intention is to exclude significant proportions of aromatic comonomers, such as styrene, α-methylstyrene or vinyltoluene, since they lead to undesired properties of the resulting product—especially on weathering.

When the tough phase is produced in the first stage, careful attention has to be paid to the setting of the particle size and its polydispersity. The particle size of the tough phase here is in essence dependent on the concentration of the emulsifier. The particle size can advantageously be controlled by the use of a seed latex. Particles whose average (weight-average) particle size is below 130 nm, preferably below 70 nm, and whose particle-size polydispersity $P_{80}$ is below 0.5 ($P_{80}$ being determined from cumulative evaluation of the particle-size distribution determined by ultracentrifuge; the relationship is: $P_{80}=[(r_{90}-r_{10})/r_{50}]-1$, where $r_{10}$, $r_{50}$, $r_{90}$=average cumulative particle radius, being the value which is greater than 10, 50, 90% of the particle radii and is smaller than 90, 50, 10% of the particle radii), preferably below 0.2, are achieved using emulsifier concentrations of from 0.15 to 1.0 wt.-%, based on the aqueous phase. This applies especially to anionic emulsifiers, examples being the particularly preferred alkoxylated and sulphated paraffins. Examples of polymerization initiators used are from 0.01 to 0.5 wt.-% of alkali metal peroxodisulphate or ammonium peroxodisulphate, based on the aqueous phase, and the polymerization reaction is initiated at temperatures of from 20 to 100° C. Preference is given to use of redox systems, an example being a combination composed of from 0.01 to 0.05 wt.-% of organic hydroperoxide and from 0.05 to 0.15 wt.-% of sodium hydroxymethylsulphinate, at temperatures of from 20 to 80° C.

The glass transition temperature of the hard phase a1) of which at least 15 wt.-% has covalent bonding to the tough phase a2) is at least 70° C. and this phase can be composed exclusively of methyl methacrylate. Up to 20 wt.-% of one or more other ethylenically unsaturated monomers which are capable of free-radical polymerization can be present as comonomers a12) in the hard phase, and the amount of alkyl (meth)acrylates used here, preferably alkyl acrylates having from 1 to 4 carbon atoms, is such that the glass transition temperature is not below the glass transition temperature mentioned above.

The polymerization of the hard phase a1) proceeds likewise in emulsion in a second stage, using the conventional auxiliaries, for example those also used for polymerization of the tough phase a2).

Thermoplastic impact modifiers have a different mechanism of action than particulate impact modifiers. They are generally mixed with the matrix material. In the case that domains are formed, as occurs, for example, in the case of use of block copolymers, preferred sizes for these domains, the size of which can be determined, for example, by electron microscopy, correspond to preferred sizes for the core-shell particles.

There are various classes of thermoplastic impact modifiers. One example thereof are aliphatic TPUs (thermoplastic polyurethanes) e.g. Desmopan® products commercially available from Covestro AG. For instance, the TPUs Desmopan® WDP 85784A, WDP 85092A, WDP 89085A and WDP 89051D, all of which have refractive indices between 1.490 and 1.500, are particularly suitable as impact modifiers.

A further class of thermoplastic polymers for use according in the foil of the present invention as impact modifiers are methacrylate-acrylate block copolymers, especially acrylic TPE, which comprises PMMA-poly-n-butyl acrylate-PMMA triblock copolymers, and which are commercially available under the Kurarity® product name by Kuraray. The poly-n-butyl acrylate blocks form nanodomains in the polymer matrix having a size between 10 and 20 nm.

The PMMA-based layer B may contain between 0.0 and 95.0 wt.-%, preferably between 10 and 90 wt.-%, particularly preferably between 15 and 85 wt.-%, for instance from 25 to 35 wt.-% or from 80 to 90 wt.-%, based on the weight of the layer B, of impact modifiers if they are crosslinked particles, especially core-shell or core-shell-shell. Foils comprising from 25 to 35 wt.-% of impact modifiers in the PMMA-based layer B are relatively stiff and are particularly advantageous for use in high pressure laminates. Foils having from 80 to 90 wt.-% of impact modifiers in the PMMA-based layer B are highly suitable for applications where a high mechanical flexibility is desired.

In the case that the impact modifiers used are thermoplastic materials, for example, the aliphatic TPUs or acrylic TPEs listed, these are usually present in the matrix material in a concentration between 3.0 and 90 wt.-%, preferably between 6.0 and 25 wt.-% and particularly preferably between 9.0 and 15 wt.-%, based on the weight of the layer B.

The cumulative content of the PMMA and the impact modifier (hereinafter referred to as "impact-modified PMMA") in the layer B is at least 50 wt.-%, preferably at least 60 wt.-%, more preferably at least 70 wt.-%, yet even more preferably at least 80 wt.-%, still more preferably at least 90 wt.-%, particularly preferably at least 95 wt.-%, based on the weight of the layer B.

UV Absorbers and UV Stabilizers

Light stabilizers are well known and are described in detail by way of example in Hans Zweifel, Plastics Additives Handbook, Hanser Verlag, 5th Edition, 2001, p. 141 ff. Light stabilizers are understood to include UV absorbers, UV stabilizers and free-radical scavengers.

UV absorbers can by way of example derive from the group of the substituted benzophenones, salicylic esters, cinnamic esters, oxanilides, benzoxazinones, hydroxyphenylbenzotriazoles, triazines or benzylidenemalonate. The best-known representatives of the UV stabilizers/free-radical scavengers are provided by the group of the sterically hindered amines (hindered amine light stabilizer, HALS).

Preferably, the combination of UV absorbers and UV stabilizers as used in the layer B is composed of the following components:
component A: a UV absorber of benzotriazole type,
component B: a UV absorber of triazine type,
component C: a UV stabilizer (HALS compound).

The individual components can be used in the form of an individual substance or in a mixture.

Examples of UV absorbers of benzotriazole type (Component A) that can be used are 2-(2-hydroxy-5-methylphenyl)benzotriazole, 2-[2-hydroxy-3,5-di(α,α-dimethylbenzyl)phenyl]-benzotriazole, 2-(2-hydroxy-3,5-di-tert-butylphenyl)benzotriazole, 2-(2-hydroxy-3,5-butyl-5-methyl-phenyl)-5-chlorobenzotriazole, 2-(2-hydroxy-3,5-di-tert-butylphenyl)-5-chlorobenzotriazole, 2-(2-hydroxy-3, 5-di-tert-amylphenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)benzotriazole, phenol, 2,2'-methylenebis[6-(2H-benzotriazol-2-yl)-4-(1,1,3,3-tetramethylbutyl)].

The amounts used of the UV absorbers of benzotriazole type are from 0.1 to 10.0 wt.-%, preferably from 0.2 to 6.0 wt.-% and very particularly preferably from 0.5 to 4.0 wt.-%, based on the weight of the PMMA-based layer B. It is also possible to use mixtures of different UV absorbers of benzotriazole type.

Triazine type UV absorbers (Component B) such as 2-(4,6-diphenyl-1,3,5-triazin-2-yl)-5-hexyloxyphenol, are preferably used in combination with the Component A.

The amounts used of the triazine type UV absorber are from 0.0 to 5.0 wt.-%, preferably from 0.2 to 3.0 wt.-% and very particularly preferably from 0.5 to 2.0 wt.-%, based on the weight of the layer B. It is also possible to use mixtures of different triazines.

Sterically hindered amines, HALS (Hindered Amine Light Stabilizer) UV stabilizers are per se known. They can be used to inhibit ageing phenomena in paints and plastics, especially in polyolefin plastics (Kunststoffe, 74 (1984) 10, pp. 620-623; Farbe+Lack, Volume 96, September 1990, pp. 689-693). The tetramethylpiperidine group present in the HALS compounds is responsible for the stabilizing effect. This class of compound can have no substitution on the piperidine nitrogen or else substitution by alkyl or acyl groups on the piperidine nitrogen. The sterically hindered amines do not absorb in the UV region. They scavenge free radicals that have been formed, whereas the UV absorbers cannot do this. Examples of HALS compounds which have stabilizing effect and which can also be used in the form of mixtures are: bis(2,2,6,6-tetramethyl-4-piperidyl) sebacate, 8-acetyl-3-dodecyl-7,7,9,9-tetramethyl-1,3,8-triazaspiro(4, 5)-decane-2,5-dione, bis(2,2,6,6-tetramethyl-4-piperidyl) succinate, poly(N-β-hydroxyethyl-2,2,6,6-tetramethyl-4-hydroxypiperidine succinate) or bis(N-methyl-2,2,6,6-tetramethyl-4-piperidyl) sebacate.

The amounts used of the HALS compounds in the layer B are typically from 0.0 to 5.0 wt.-%, preferably from 0.1 to 3.0 wt.-% and very particularly preferably from 0.2 to 2.0 wt.-%, based on the weight of the layer B. It is also possible to use mixtures of different HALS compounds.

Other co-stabilizers that can be used are the HALS compounds described above, disulphites, such as sodium disulphite, and sterically hindered phenols and phosphites. Such co-stabilizers may be present in a concentration of 0.1 to 5.0 wt. %, based on the weight of the layer B.

Sterically hindered phenols are particularly suitable for use in the foil of the present invention. Preferred sterically hindered phenols include inter alia 6-tert-butyl-3-methylphenyl derivatives, 2,6-di-tert-butyl-p-cresol, 2,6-tert-butyl-4-ethyl phenol, 2,2'-methylenebis-(4-ethyl-6-tert-butyl phenol), 4,4'-butylidenebis(6-tert-butyl-m-cresol), 4,4'-thiobis(6-tert-butyl-m-cresol), 4,4'-dihydroxy diphenyl cyclohexane, alkylated bisphenol, styrenated phenol, 2,6-di-tert-butyl-4-methyl phenol, n-octadecyl-3-(3',5'-di-tert-butyl-4'-hydroxy phenyl)propionate, 2,2'-methylenebis(4-methyl-6-tert-butyl phenol), 4,4'-thiobis(3-methyl-6-tertbutylphenyl), 4,4'-butylidenebis(3-methyl-6-tert-butylphenol), stearyl-β(3,5-di-4-butyl-4-hydroxy phenyl) propionate, 1,1,3-tris(2-methyl-4-hydroxy-5-tert-butylphenyl)butane, 1,3,5-trimethyl-2,4,6-tris(3-5-di-tert-butyl-4hydroxybenzyl)benzene, tetrakis-[methylene-3-(3', 5'-di-tert-butyl-4'-hydroxyphenyl)propionate]methane. Commercially available sterically hindered phenols include SUMILIZER BHT BP-76, WXR, GA-80 and BP-101 (SUMITOMO), IRGANOX 1076, 565, 1035, 1425WL, 3114, 1330 and 1010 (BASF SE), MARK AO-50, -80, -30, -20, -330 and -60 (ADEKA ARGUS), and TOMINOX SS, TT (YOSHITOMI), IONOX WSP (ICI), SANTONOX (MONSANTO), ANTAGECRYSTAL (KAWAGUCHI), NOCLIZER NS-6 (OUCHI SHINKO), TOPANOL CA (ICI), CYANOX 1790 (ACC).

In one preferred embodiment the layer B comprises:

from 0.5 to 4.0 wt.-% of a benzotriazole type compound as a first UV absorber;

from 0.5 to 3.0 wt.-% of a triazine type compound as a second UV absorber; and from 0.2 to 2.0 wt.-% of a HALS type compound as a UV stabilizer, based on the total weight of the layer B.

Adhesion-promoting Copolymer

Typically, the adhesion-promoting copolymer in the layer B and/or in the layer C, if this layer is present, comprises:

(i) 50.0 to 95 wt.-% of methacrylic acid ester of a C1-C6 alcohol, (ii) 0.5 to 15.0 wt.-% of an adhesion-promoting monomer, (iii) 5.0 to 25.0 wt.-% of at least one vinyl aromatic substance, as well as optionally (iv) 0.0 to 5.0 wt.-% of alkylacrylate having 1 to 6 carbon atoms in the ester group.

For instance, the adhesion-promoting copolymer in the layer B and/or in the layer C, if this layer is present, may comprise (i) from 70.0 to 95.0 wt.-% methyl methacrylate;

(ii) from 0.5 to 15.0 wt.-% maleic anhydride; and (iii) from 0.0 to 25.0 wt.-% of other vinyl-copolymerizable monomers having no functional groups other than the vinyl function, based on the weight of the adhesion-promoting copolymer.

The monomers (i) are selected from the group of alkyl (meth)acrylates having 1 to 6 carbon atoms in the ester group such as ethylmethacrylate, propylmethacrylate, isopropylmethacrylate, butylmethacrylate, isobutylmethacrylate, tert-butylmethacrylate, pentylmethacrylate, isopentylmethacrylate, hexylmethacrylate, 2,2-dimethylbutylmethacrylate, cyclopentylmethacrylate, and cyclohexylmethacrylate as well as the particularly preferred methylmethacrylate.

The monomers (iii) can be selected from a group of vinyl aromatic substances such as α-halogen styrene, p-methylstyrene, p-tert-butylstyrene, vinylnaphthalene, as well as, preferably, α-methyl styrene and styrene, wherein styrene is particularly preferred.

The adhesion-promoting monomers (ii) are those monomers capable of free-radical polymerization which have functional groups which can interact with the materials to be coated. This interaction is to be brought about at least via a chemical (covalent) bond. In addition, it may be promoted, by way of example, by hydrogen bonding, complexing, dipole forces or thermodynamic compatibility (intertwining of the polymer chains) or the like. These interactions generally involve heteroatoms, such as nitrogen or oxygen. Functional groups which may be mentioned are the amino group, in particular the dialkylamino group, (cyclic) amide group, imide group, hydroxy group, (ep)oxy group, carboxy group, (iso)cyano group. These monomers are known per se (cf. H. Rauch Puntigam, Th. Völker, Acryl and Methacryl-verbindungen, Springer-Verlag 1967; Kirk-Othmer, Encyclopedia of Chemical Technology, 3rd. Ed., Vol. 1, pp. 394-400, J. Wiley 1978; DE-A 25 56 080; DE-A 26 34 003).

The adhesion-improving monomers therefore preferably belong to the monomer class of the nitrogen-containing vinyl heterocycles preferably having 5-membered rings alongside 6-membered rings, and/or of the copolymerizable vinylic carboxylic acids and/or of the hydroxyalkyl-, alkoxyalkyl-, epoxy- or aminoalkyl substituted esters or amides of fumaric, maleic, itaconic, acrylic, or methacrylic acid. Nitrogen-heterocyclic monomers which may particularly be mentioned are those from the class of the vinylimidazoles, of the vinyllactams, of the vinylcarbazoles, and of the vinylpyridines. Examples of these monomeric imidazole compounds, which are not intended to represent any form of restriction, are N-vinylimidazole (also termed vinyl-1-imidazole), N-vinylmethyl-2-imidazole, N-vinylethyl-2-imidazole, N-vinylphenyl-2-imidazole, N-vinyldimethyl-2,4-imidazole, N-vinylbenzimidazole, N-vinylimidazoline (also termed vinyl-1-imidazoline), N-vinylmethyl-2-imidazoline, N-vinylphenyl-2-imidazoline and vinyl-2-imidazole.

Particular examples which may be mentioned of monomers derived from the lactams are compounds such as the following: N-vinylpyrrolidone, N-vinylmethyl-5-pyrrolidone, N-vinylmethyl-3-pyrrolidone, N-vinylethyl-5-pyrrolidone, N-vinyldimethyl-5,5-pyrrolidone, N-vinylphenyl-5-pyrrolidone, N-allylpyrrolidone, N-vinylthiopyrrolidone, N-vinylpiperidone, N-vinyldiethyl-6,6-piperidone, N-vinylcaprolactam, N-vinylmethyl-7-caprolactam, N-vinylethyl-7-caprolactam, N-vinyldimethyl-7,7-caprolactam, N-allylcaprolactam, N-vinylcaprylolactam.

Among the monomers which derive from carbazole mention may particularly be made of: N-vinylcarbazole, N-allycarbazole, N-butenylcarbazole, N-hexenylcarbazole and N-(methyl-1-ethylene)carbazole. Among the copolymerizable vinylic carboxylic acids, mention may in particular be made of maleic acid, fumaric acid, itaconic acid and suitable salts, esters or amides of the same. Mention may also be made of the following epoxy-, oxy or alkoxy-substituted alkyl esters of (meth)acrylic acid: glycidyl methacrylate, 2-hydroxyethyl (meth)acrylate, hydroxypropyl (meth)acrylate, 2-methoxyethyl (meth)acrylate, 2-ethoxyethyl (meth) acrylate, 2-butoxyethyl (meth)acrylate, 2-(2-butoxyethoxy) ethyl methacrylate, 2-(ethoxyethyloxy)ethyl (meth)acrylate, 4-hydroxybutyl(meth)acrylate, 2-[2-(2-ethoxyethoxy) ethoxy]ethyl(meth)acrylate, 3-methoxybutyl-1-(meth)acrylate, 2-alkoxymethylethyl (meth)acrylate, 2-hexoxyethyl (meth)acrylate.

Mentioned may also be the following amine-substituted alkyl esters of (meth)acrylic acid: 2-dimethylaminoethyl (meth)acrylate, 2-diethylaminoethyl, (meth)acrylate, 3-dimethylamino-2,2-dimethylpropyl 1-(meth)acrylate, 3-dimethylamino-2,2-dimethylpropyl 1-(meth)acrylate, 2-morpholinoethyl(meth)acrylate, 2-tert-butylaminoethyl (meth) acrylate, 3-(dimethylamino)propyl (meth)acrylate, 2-(dimethylaminoethoxyethyl)(meth)acrylate.

Mention may be made by may of example of the following monomers which are representatives of the (meth) acrylamides: N-methyl(meth)acrylamide, N-dimethylaminoethyl(meth)-acrylamide, N-dimethylaminopropyl(meth) acrylamide, N-isopropyl(meth)acrylamide, N-tert-butyl (meth)-acrylamide, N-isobutyl(meth)acrylamide, N-decyl (meth)-acrylamide, N-cyclohexyl(meth)acrylamide, N-[3-(dimethylamino)-2,2-dimethylpropyl]methacrylamide, N-[2-hydroxyethyl](meth)acrylamide.

It is particularly advantageous to use "adhesion promoting monomers" (ii) selected from the group consisting of GMA (glycidyl methacrylate), maleic acid derivatives, such as maleic acid, maleic anhydride (MA), methylmaleic anhydride, maleimide, methylmaleimide, maleamides (MAs), phenylmaleimide and cyclohexylmaleimide, fumaric acid derivatives, methacrylic anhydride, acrylic anhydride.

Preferably, the adhesion-promoting monomer (ii) is maleic anhydride.

The alkylacrylates (iv) may be optionally incorporated in amounts of up to 5.0 wt.-% to improve the rheological properties of the adhesion-promoting copolymer. Alkylacrylates having 1 to 6 carbon atoms in the ester group may be, for example, ethylacrylate, isopropylacrylate, propylacrylate, isobutylacrylate, tert-butylacrylate, pentylacrylate, hexylacrylate as well as, preferably, butylacrylate and the especially preferred methylacrylate.

In a preferred embodiment, the adhesion-promoting copolymer comprises:
(i) from 50.0 to 95.0 wt.-%, preferably 60.0 to 90.0 wt.-%, more preferably from 70.0 to 85.0 wt.-%, even more preferably 70 to 80 wt.-% methyl methacrylate;
(ii) from 0.2 to 25.0 wt.-%, preferably from 0.5 to 20.0 wt.-%, more preferably from 1.0 to 15.0 wt.-% and even more preferably 5.0 to 12.0 wt.-% maleic anhydride; and
(iii) from 0.0 to 25.0 wt.-%, preferably from 2.0 to 15.0 wt.-% of other vinyl-copolymerizable monomers having no functional groups other than the vinyl function, based on the weight of the copolymer.

In a particularly preferred embodiment, the adhesion-promoting copolymer is a copolymer of MMA, styrene and maleic anhydride.

Figure 2:
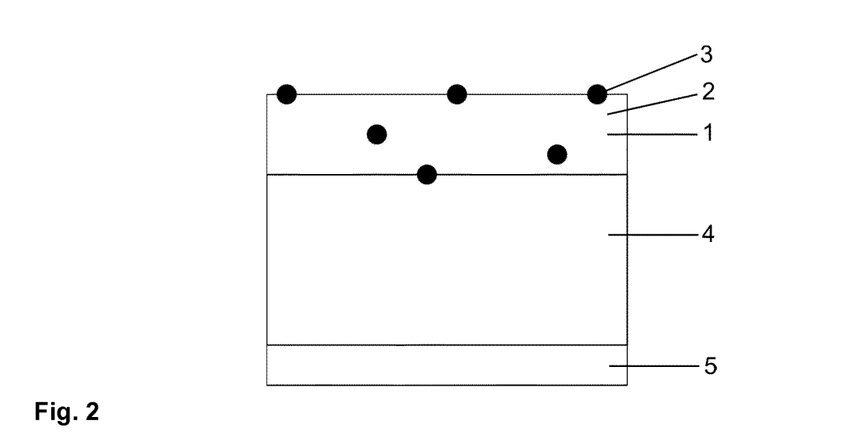

Depending on the substrate to be protected, the adhesion-promoting copolymer may be located in a separate layer C rather than in the PMMA-based layer B (cf. FIG. 2). In this embodiment, the layer C with an adhesion-promoting copolymer comprises
(i) from 50.0 to 95.0 wt.-%, preferably 60.0 to 90.0 wt.-%, more preferably from 70.0 to 85.0 wt.-%, even more preferably 70 to 80 wt.-% methyl methacrylate;
(ii) from 0.2 to 25.0 wt.-%, preferably from 0.5 to 20.0 wt.-%, more preferably from 1.0 to 15.0 wt.-% and even more preferably 5.0 to 12.0 wt.-% maleic anhydride; and
(iii) from 0.0 to 25.0 wt.-%, preferably from 2.0 to 15.0 wt.-% of other vinyl-copolymerizable monomers having no functional groups other than the vinyl function, based on the weight of the copolymer.

Typically, if the layer C is present, the order of layers in the foil of the present invention, is as follows: A-B-C. In a most preferred embodiment, the foil of the present invention consists of the layers A, B and C located in this order in respect to each other.

Depending on the substrate on which the foil is applied, the layer B may also be substantially free of the adhesion-promoting copolymer. In this case, the PMMA-based layer B may comprise:
from 10.0 to 90.0 wt.-% of a poly(methyl)methacrylate;
from 10.0 to 90.0 wt.-% of one or several impact modifiers;
from 0.0 to 5.0 wt.-%, preferably from 1.0 to 4.0 wt.-% of one or several UV-absorbers;
from 0.0 to 5.0 wt.-%, preferably from 0.5 to 3.0 wt.-% of one or several UV-stabilizers, based on the total weight of the layer B.

The adhesion-promoting copolymer may be obtained in a manner known per se via free-radical polymerization. By way of example, EP 264 590 A1 describes a process for preparing a copolymer from a monomer mixture composed of methyl methacrylate, vinylaromatic compound, maleic anhydride and, where appropriate, from a lower alkyl acrylate, by carrying out the polymerization to 50% conversion in the presence or absence of a non-polymerizable organic solvent, and continuing the polymerization beyond a conversion of at least 50% in the temperature range from 75 to 150° C. in the presence of an organic solvent to at least 80% conversion, and then evaporating the low-molecular-weight volatile constituents.

JP-A 60-147 417 describes a process for preparing a copolymer by feeding, at a temperature of from 100 to 180° C., a monomer mixture composed of methyl methacrylate, maleic anhydride and at least one vinylaromatic compound into a polymerization reactor suitable for solution polymerization or bulk polymerization, and polymerizing the material. DE-A 44 40 219 describes a further preparation process.

The adhesion-promoting copolymers described in EP 264 590 A1 and JP-A 60-147 417 may be advantageously used in the foil of the present invention.

Properties of the Foil

Depending on the envisaged purpose, the foil of the present invention may have a total thickness between 1.0 μm and 300.0 μm, more preferably between 1.0 μm and 200.0 μm, yet even more preferably between 5.0 μm and 100.0 μm.

The thickness of the foil of the present invention and of its layers can be determined by mechanical scanning according to the norm ISO 4593-1993. Additionally, the thickness of the foil of the present invention and of its individual layers can be determined using a scanning electron microscope, as described above. For this purpose, the foil samples can be frozen in liquid nitrogen, mechanically broken and the freshly obtained surfaces are analysed.

The fluoropolymer-based layer A typically has a thickness from 1.0 μm to 30.0 μm, preferably from 5.0 μm to 20.0 μm.

The layer B usually has a thickness between 10.0 μm and 200.0 μm, preferably between 15.0 μm and 150.0 μm.

The adhesion-promoting layer C, if present, usually has a thickness from 1.0 μm to 30.0 μm, preferably from 5.0 μm to 20.0 μm.

The outer surface of the layer A of foil of the present invention typically has a roughness value Rz to DIN 4768 of at least 0.7 μm, preferably from 1.0 to 2.0 μm. The roughness measurements can be carried out using a commercially available instrument such as Form Talysurf 50 produced by Rank Taylor Hobson GmbH.

The gloss (R 60°) of the outer surface of the layer A to DIN 67530 (January 2082) is usually at most 40, preferably at most 30, in particular from 15 to 30. The gloss measurements can be carried out using an RL laboratory reflectometer such as a reflectometer of Fa. Dr. Hach-Lange.

Process for the Manufacturing of the Foil

Depending on the intended application, the foil of the present invention can be produced at any desired thickness. A surprising factor here is the ability to retain a uniform degree of matiness, even under mechanical pressure at increased temperatures, for instance during a lamination process, an exceptional weathering resistance and mechanical stability and a very high weathering and mechanical protection provided to the substrate. However, for the purposes of the invention preference is given to a relatively thin plastics moulding, namely a film or a foil, characterized by a thickness in the range from 10.0 to 200.0 μm, preferably in the range from 40.0 to 120.0 μm, particularly preferably in the range from 50.0 to 90.0 μm.

The mixtures of individual components of the layers A, B and C can be prepared via dry blending of the components, which are in pulverulent, granular, or preferably pelletized, form. Such mixtures may also be processed via melting and mixing of the individual components in the molten state or via melting of dry premixes of the individual components to give a ready-to-use moulding composition. By way of example, this may take place in single- or twin-screw extruders. The resultant extrudate may then be pelletized. Conventional additives, auxiliaries and/or fillers may be admixed directly or added subsequently by the final user as required.

The multilayer foil of the present invention can then produced by methods known per se, examples being co-extrusion or lamination or by extrusion lamination.

One particular production variant relates to a process comprising a step in which the foil of the present invention is moulded in a foil-moulding process, preferably in chill-roll process from a composition comprising:
from 40.0 to 97.0 wt.-% of a fluoropolymer;
from 0.0 to 45.0 wt.-% of a polyalkyl(meth)acrylate; and
from 3.0 to 25.0 wt.-% of glass beads, based on the total weight of the composition.

Said composition forms the layer A of the resulting foil. The composition of layers B and, if present C, is as described above.

Application of the Foil onto a Substrate

The inventive foils have a broad range of applications. One preferred use of the foils is coating of plastics mouldings. Here, it is particularly advantageous to coat plastics mouldings which comprise PVC, or are composed of PVC. The protected substrate is advantageously by way of example a window profile composed of aluminium, of wood, of plastic or of a composite material, may bear a decorative foil, preferably composed of PVC. This article is then protected from weathering by using the inventive foil. Another preferred use of the inventive foil is design of a high-specification, durable surface finish for substrate materials.

As will be readily appreciated by skilled person, the foil of the present invention is applied to a substrate in such a way that the layer A forms the outer surface of the coated substrate. In other words, if the foil of the present invention substantially consists of layers A and B, the layer B is located between the layer A and the substrate. In embodiments, in which the foil of the present invention further comprises the layer C, the layer C is located between the layer B and the surface of the coated substrate.

Hence, a further aspect of the present invention is a process for the manufacturing of a coated article, comprising a step of applying a foil onto the surface of said substrate.

Application of the inventive foil to the substrate is in all cases relatively simple. The foil is preferably applied by means of co-extrusion to the material to be protected. Application of the foil by means of foil lamination to the material to be protected is also possible. Preference is also given to a use which is characterized in that the foil is applied by means of extrusion lamination to the material to be protected. Preferably, extrusion lamination is carried out at a temperature greater than or equal to 120° C. and upon application of a mechanical pressure greater than or equal to 1 MPa, preferably greater than or equal to 2 MPa, more preferably greater than or equal to 4 MPa, more preferably greater than or equal to 6 MPa, more preferably greater than or equal to 7 MPa.

In one embodiment of the present invention, the article itself may be a foil or a sheet, which can be conveniently stored and/or handled in form of a roll.

In a particularly preferred embodiment, multi-layer materials obtainable using the foil of the invention are decorative high-pressure laminates (HPLs) according to EN 438-6, which are composed of layers of webs of fibrous material (e.g. paper), impregnated with curable resins, these being bonded to one another by means of the high-pressure process described below. The surface layer of the material, one or both sides of which have decorative colours or patterns, is impregnated with resins based on amino plastics, e.g. melamine resins. The amino or methylolamino groups present in the decorative layer during the high-pressure process then serve as reaction partners for covalent bonding to the polymethacrylate layer (in this case foils) for surface finishing. The corresponding high-pressure laminates are described inter alia in US 2017/019 7391 A1.

Hence, one aspect of the present invention relates to a process for the manufacturing of a high-pressure laminate using the foil as described above.

The high-pressure process produces a long lasting bond between the decorative layer and the polymethacrylate layer applied according to the invention. The temperature set during the process and the associated interpenetration of the melamine-resin-saturated decorative paper into the foil ensures sufficient formation of covalent bonds and therefore long lasting bonding to the material.

The high-pressure process is defined as simultaneous use of heat (temperature greater than or equal to 120° C.) and high pressure (greater than or equal to 5 MPa), the result being that the curable resins flow and then harden to produce a homogeneous non-porous material of relatively high density (at least 1.35 g/cm$^3$) having the required surface structure.

Remarkably, during preparation of high-pressure laminates the surface roughness and matiness of the foil of the present invention remains substantially unchanged despite use of high temperatures and pressures. In the resulting laminate the glass beads are protruding from the surface of the layer A and remain visible, even if the temperatures during manufacturing of the laminate are as high as 170° C.

SEM Images

SEM images were obtained using a scanning electron microscope JEOL JSM-IT300, commercially obtainable from JEOL Ltd.

The measurement parameters were as follows:
Variable flow of electrons from a tungsten filament (cathode)
Vacuum system: Rotary pump/oil diffusion pump
X-Y-Z-rotation-tilt: totally motorized
Working distance (WD): 5 to 70 mm (common: 10 mm)
Sample rotation: 360°
Sample tilting: −5 to max. 90° (depending on WD)
Magnification: 10× to 300 000×
Maximum resolution: ~3 nm
Detectors: Secondary Electrons (SE)
Back Scattered Electrons (BSE, 5 segments)
Energy dispersive X-Ray Analysis (EDS)
Sample Preparation For the measurement of foil thickness, the samples were frozen using liquid nitrogen and mechanically broken. For this purpose, a brittle fracture was performed. The obtained fracture surface was analysed.

Electrically Conductive Layer

All standard preparations were sputtered with gold to obtain an electrically conductive surface.

Measurements in the Image

The average thickness of the foil and the average thickness of individual layers were measured in the SEM image.

To enable subsequent measurements of existing images all images as well as the relevant measurement parameters were stored in a SEM image database.

EXAMPLES

Example 1 (Comparative Foil)

A PMMA/PVDF foil without glass beads and having a total thickness of 50 µm was prepared by co-extrusion at 240-250° C. (melt temperature) at extrusion speed 7.3 m/min using a 35 mm-Diameter single screw extruder and a 25 mm-Diameter single screw coextruder.

The thickness of the coextruded PVDF layer A was 5 µm. The layer A consisted of 100 wt.-% PVDF T850, available from Kureha.

The thickness of the coextruded PMMA based layer B was 45 µm. The layer B was prepared from a compounded mixture consisting of
- a) 85.6 wt.-% of a polymer acrylic core shell impact modifier with a composition of 61.3 wt.-% of methyl methacrylate, 38.0 wt.-% of butyl acrylate, 0.7 wt.-% of allyl methacrylate,
- b) 12.3 wt.-% PLEXIGLAS® 7H, available from Evonik Performance Materials GmbH,
- c) 1.0 wt.-% of Tinuvin® 360, available from BASF SE,
- d) 0.4 wt.-% of Sabostab® UV 119, available from Sabo S.p.A.,
- d) 0.7 wt.-% of Tinuvin® 1600, available from BASF SE

Example 2 (Foil According to the Invention)

PMMA/PVDF matt foil having a thickness of 50 µm was prepared by co-extrusion under the same conditions as in Example 1.

The co-extruded PVDF based layer A had a thickness of 5 µm and the following composition:
- a) 90 wt.-% PVDF T850, available from Kureha Corp.,
- b) 10 wt.-% Omicron® NP3 P0 glass beads, available from Sovitec Mondial SA.

The PMMA based layer B had a thickness of 45 µm and was prepared from of a compounded mixture consisting of
- a) 85.6 wt.-% of a polymer acrylic core shell impact modifier with a composition of 61.3 wt.-% of methyl methacrylate, 38.0 wt.-% of butyl acrylate, 0.7 wt.-% of allyl methacrylate,
- b) 12.3 wt.-% PLEXIGLAS® 7H, available from Evonik Performance Materials GmbH,
- c) 1.0 wt.-% of Tinuvin® 360, available from BASF SE,
- d) 0.4 wt.-% of Sabostab® UV 119, available from Sabo S.p.A.,
- d) 0.7 wt.-% of Tinuvin® 1600, available from BASF SE.

Example 3 (Foil According to the Invention)

PMMA/PVDF matt foil having a thickness of 50 µm was prepared by co-extrusion under the same conditions as in Example 1.

The co-extruded PVDF based layer A had a thickness of 5 µm and the following composition:
- a) 90 wt.-% PVDF T850, available from Kureha Corp.,
- b) 10 wt.-% Spheriglass® 5000 CP-26 glass beads, available from Potters Ind. LLC.

The PMMA based layer B had a thickness of 45 µm and was prepared from of a compounded mixture consisting of
- a) 85.6 wt.-% of a polymer acrylic core shell impact modifier with a composition of
    61.3 wt.-% of methyl methacrylate,
    38.0 wt.-% of butyl acrylate,
    0.7 wt.-% of allyl methacrylate,
- b) 12.3 wt.-% PLEXIGLAS® 7H, available from Evonik Performance Materials GmbH,
- c) 1.0 wt.-% of Tinuvin® 360, available from BASF SE,
- d) 0.4 wt.-% of Sabostab® UV 119, available from Sabo S.p.A.,
- d) 0.7 wt.-% of Tinuvin® 1600, available from BASF SE.

Example 4 (Foil According to the Invention)

PMMA/PVDF matt foil having a thickness of 50 µm was prepared by co-extrusion under the same conditions as in Example 1.

The co-extruded PVDF based layer A had a thickness of 5 µm and the following composition:
- a) 93.0 wt.-% PVDF T850, available from Kureha Corp.,
- b) 7.0 wt.-% Omicron® NP3 P0 glass beads, available from Sovitec Mondial SA.

The PMMA based layer B had a thickness of 45 µm and was prepared from of a compounded mixture consisting of
- a) 85.6 wt.-% of a polymer acrylic core shell impact modifier with a composition of
    61.3 wt.-% of methyl methacrylate,
    38.0 wt.-% of butyl acrylate,
    0.7 wt.-% of allyl methacrylate,
- b) 12.3 wt.-% PLEXIGLAS® 7H, available from Evonik Performance Materials GmbH,
- c) 1.0 wt.-% of Tinuvin® 360, available from BASF SE,
- d) 0.4 wt.-% of Sabostab® UV 119, available from Sabo S.p.A.,
- d) 0.7 wt.-% of Tinuvin® 1600, available from BASF SE.

The foils of Examples 1 to 4 were then laminated to a black PVC decorative film. Subsequently gloss of the coated PVC decorative films was measured according to the norm DIN 67530 at an angle of 60° using REFO 60 Portable reflectometer from Dr Hach-Lange.

The yield stress and the nominal tensile strain at break of the coextruded PMMA/PVDF foils were measured according to ISO 527-3/2/100 using UPM Z005 from Zwick.

Example 5 (Comparative Foil)

A PMMA/PVDF foil without glass beads was prepared by co-extrusion under the same conditions as in Example 1.

The thickness of the coextruded PVDF layer A was between 5 µm and 8 µm. The layer A consisted of 100 wt.-% PVDF T850, available from Kureha.

The thickness of the coextruded PMMA based layer B was 45 µm. The layer B was prepared from a compounded mixture consisting of
- a) 85.6 wt.-% of a polymer acrylic core shell impact modifier with a composition of
    61.3 wt.-% of methylmethacrylat,
    38.0 wt.-% of butyl acrylate,
    0.7 wt.-% of allyl methacrylate,
- b) 12.3 wt.-% PLEXIGLAS® 7H, available from Evonik Performance Materials GmbH,
- c) 1.0 wt.-% of Tinuvin® 360, available from BASF SE,
- d) 0.4 wt.-% of Sabostab® UV 119, available from Sabo S.p.A.,
- d) 0.7 wt.-% of Tinuvin® 1600, available from BASF SE

Example 6 (Foil According to the Invention)

PMMA/PVDF matt foil having a thickness of 53 µm was prepared by co-extrusion under the same conditions as in Example 1.

Figure 3:
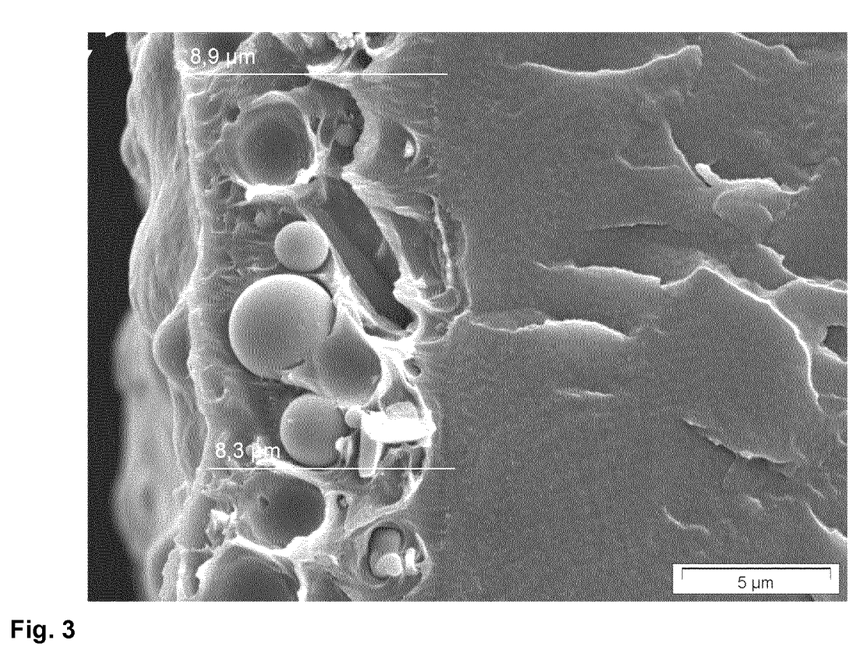

Subsequently, the foil was analysed as described above using a scanning electron microscope. The obtained microphotograph shown in FIG. 3.

The co-extruded PVDF based layer A had a thickness of 5 μm to 10 μm and the following composition:
  a) 75 wt.-% PVDF T850, available from Kureha Corp.,
  b) 25 wt.-% Spheriglass® 7010 CP-26 glass beads (diameter below 10 μm), available from Potters Ind. LLC.

The PMMA based layer B had a thickness of 45 μm and was prepared from of a compounded mixture consisting of
  a) 85.6 wt.-% of a polymer acrylic core shell impact modifier with a composition of
    61.3 wt.-% of methyl methacrylate,
    38.0 wt.-% of butyl acrylate,
    0.7 wt.-% of allyl methacrylate,
  b) 12.3 wt.-% PLEXIGLAS® 7H, available from Evonik Performance Materials GmbH,
  c) 1.0 wt.-% of Tinuvin® 360, available from BASF SE,
  d) 0.4 wt.-% of Sabostab® UV 119, available from Sabo S.p.A.,
  d) 0.7 wt.-% of Tinuvin® 1600, available from BASF SE.

Example 7 (Foil According to the Invention)

PMMA/PVDF matt foil having a thickness of 53 μm was prepared by co-extrusion under the same conditions as in Example 1.

The co-extruded PVDF based layer A had a thickness of 5 μm to 10 μm and the following composition:
  a) 83.33 wt.-% PVDF T850, available from Kureha Corp.,
  b) 16.67 wt.-% Spheriglass® 7010 CP-26 glass beads (diameter below 10 μm), available from Potters Ind. LLC.

The PMMA based layer B had a thickness of 45 μm and was prepared from of a compounded mixture consisting of
  a) 85.6 wt.-% of a polymer acrylic core shell impact modifier with a composition of
    61.3 wt.-% of methyl methacrylate,
    38.0 wt.-% of butyl acrylate,
    0.7 wt.-% of allyl methacrylate,
  b) 12.3 wt.-% PLEXIGLAS® 7H, available from Evonik Performance Materials GmbH,
  c) 1.0 wt.-% of Tinuvin® 360, available from BASF SE,
  d) 0.4 wt.-% of Sabostab® UV 119, available from Sabo S.p.A.,
  d) 0.7 wt.-% of Tinuvin® 1600, available from BASF SE.

The results of the measurements are summarized in Table 1:

The matted foils of Example 2-4 had a uniform matt appearance, whereas the foil of Example 1 was glossy, due to inherent glossiness of the unmodified PVDF layer.

Importantly, the matted foils of Example 2-4 had excellent mechanical properties and did not show any stress-whitening or worsening of the break elongation test results. The measured yield stress values were only slightly below the value of the unmodified foil of Example 1. This demonstrates a surprisingly high degree of adhesion between the PVDF matrix of the PVDF layer and the glass beads embedded therein.

Examples 8-10 Investigation of Thermal Stability

In the following tests, thermal stability of moulding compounds consisting of PVDF and glass beads was investigated.

Example 8

As a reference, unmodified PVDF Kureha T850 was used.

Example 9

A composition consisting of PVDF Kureha T850 with 20 wt.-% glass beads Omicron® NP3 P0.

Example 10

A composition consisting of PVDF Kureha T850 with 20 wt.-% Spheriglass® Potters 5000 CP-26

The samples of Examples 8-10 were subjected to a thermogravimetric analysis (TGA). The samples were not conditioned. The measurements were carried out at 240° C. for 60 minutes under nitrogen atmosphere using a Q5000 from TA Instruments. All samples showed after 40 minutes at 240° C. a residual degradation of about 0.1%.

Under these conditions, all three samples showed a substantially identical behaviour.

Afterwards, the molecular weight distribution of the soluble part of the samples was analysed. The samples were dissolved at 50° C. in a standard eluent obtainable from System AC (based on DMA as a solvent). The same eluent system was also employed for the measurement. The undissolved residues of the samples (glass beads) were separated before the analysis by centrifugation.

TABLE 1

| | Composition | | wt.-% of glass beads | Gloss [60°] from the PVDF surface, | yield stress, MPa, | nominal tensile strain at break, %, |
|---|---|---|---|---|---|---|
| Example | layer B | layer A | in the layer A | DIN 67530 | ISO 527-3/2/100 | ISO 527-3/2/100 |
| 1 | 45 μm impact-modified PMMA with UV absorbers/stabilizer | 5 μm PVDF Kureha T850 | 0 | 52-60 | 37.7 | 80.2 |
| 2 | 45 μm impact-modified PMMA with UV absorbers/stabilizer | 5 μm PVDF Kureha T850 with 10 wt.-% glass beads Omicron® NP3 P0 | 10 | 16-19 | 35.2 | 78.1 |
| 3 | 45 μm impact-modified PMMA with UV absorbers/stabilizer | 5 μm PVDF Kureha T850 with 10 wt.-% glass beads Spheriglass® Potters 5000 CP-26 | 10 | 20-22 | 33.3 | 81.9 |
| 4 | 45 μm impact-modified PMMA with UV absorbers/stabilizer | 5 μm PVDF Kureha T850 with 7 wt.-% glass beads Omicron® NP3 P0 | 7 | 23-26 | 35.6 | 86.4 |

GPC Measurement Conditions:
Columns: 1 Precolumn 8×50 mm+3 GRAM Columns 8×300 mm (company PSS at Mainz)
Precolumn GRAM 10µ 8×50 mm
1 GRAM 30 Å 10µ 8×300 mm
2 GRAM 10000 Å 10µ 8×300 mm
3 GRAM 10000 Å 10µ 8×300 mm
Instruments: Agilent 1100 Series Pump G1310 Å
PSS SECcurity Inline-Degaser
Agilent 1100 Series Autosampler G1313 Å
Agilent 1100 Series Column oven G1316 Å 60° C.
Agilent 1100 Series RI-Detector G1362 Å 40° C.
Agilent 1100 Series Control-Module G1323B
Eluent: N,N-Dimethylacetamide (HPLC-Grade)+0.3% (3 g/l) LiBr+0.1 mol (6 g/l) $CH_3COOH$+1% $H_2O$
Flow rate: 1 ml/min
Injected volume: 100 µl
Detection: RI: Temperature 40° C.
Concentration
sample solution: 2 g/l
Standard: PMMA (f. example PSS (Mainz))
Concentration of
the standard solution: 1 g/l (for Mw>106: 0.5 g/l) (narrow distribution)
Internal standard: 1,2-Dichlorobenzene, 0.5 µl/100 µl (injectorprogram of the autosampler)

Industry standards were based on ISO 16014-1 Plastics— Determination of average molecular mass and molecular mass distribution of polymers using size exclusion chromatography DIN 55672-2 Gelpermeationschromatographie (GPC)—Teil 2: N,N-Dimethylacetamid (DMAC) als Elutionsmittel Gel permeation chromatography (GPC)—Part 2: N,N-Dimethylacetamide (DMAC) as elution solvent deviation: temperature (60° C. instead of 80° C.), eluent composition (addition of acid and water).

The measured molecular weight distributions of the samples are summarised in Table 2:

TABLE 2

| | Mn g/mol | Mw g/mol | PDI | Peak area ml * V |
|---|---|---|---|---|
| Example 5 | 76 600 | 201 000 | 2.63 | 0.02079 |
| Example 6 | 94 400 | 211 000 | 2.24 | 0.01936 |
| Example 7 | 95 200 | 214 000 | 2.25 | 0.01867 |

The data in Table 2 show that no noticeable differences between the samples could be detected. All three samples showed a substantially identical behaviour.

These results indicate that, contrary a common technical prejudice, no detectable catalytic decomposition of PVDF on the surface of glass beads takes place at 240° C. Thus, the thermal stability of the foils of the present invention substantially corresponds to the thermal stability of the corresponding unmodified foils.

Example 11

To simulate conditions during a lamination process, the foils of Examples 5-7 were pressed onto a black PMMA plate at 150° C. and 180° C. using a polished steel plate or a matt rubber plate. Subsequently, the gloss values at 60° were measured.

The obtained results are summarised in Table 3 below:

| Foil | Gloss after pressing at 150° C. with a steel plate | Gloss after pressing at 180° C. with a steel plate | Gloss after pressing at 150° C. with a rubber mate | Gloss after pressing at 180° C. with a rubber mate |
|---|---|---|---|---|
| Example 5 (comparative) | 13 to 20 | 11 to 17 | 10 to 21 | 4 to 13 |
| Example 6 | 2 to 4 | 3 to 4 | 2 to 4 | 1 to 1.5 |
| Example 7 | 4 to 5 | 6 to 7 | 4 to 5 | 0 to 2 |

The foils of Examples 6 and 7 substantially retain their degree of gloss during the lamination below and above the melting temperature range of PVDF (170° C.). Both materials have a homogeneous matt appearance which is substantially independent and the temperature during the process and surface texture of the employed tool. In particular, no undesired high-gloss areas or edges where observed.

This is not the case with the foil of comparative Example 5. Here, the degree of gloss strongly depends on the process parameters such as temperature and on the surface of the employed tool. This dependency renders the lamination process more difficult and cost-intensive, since a relatively narrow temperature range and specific tools need to be employed.

The invention claimed is:
1. A coextruded multilayer foil, comprising:
at least a layer A, and
a layer B,
wherein
the layer A comprises, based on the total weight of the layer A:
from 40.0 to 97.0 wt. % of a fluoropolymer selected from polyvinylidene fluoride (PVDF), polyvinylfluoride (PVF), polytetrafluorethylene (PTFE), polyethylenetetrafluoroethylene (ETFE), fluorinated ethylene-propylene (FEP) or a mixture or copolymer thereof;
from 0.0 to 45.0 wt. % of a polyalkyl(meth)acrylate; and
from 3.0 to 30.0 wt. % of glass beads; and
the layer B comprises, based on the total weight of the layer B:
from 10.0 to 90.0 wt. % of a poly(methyl)methacrylate;
from 10.0 to 90.0 wt. % of one or several impact modifiers selected from particulate impact modifiers and thermoplastic impact modifiers;
from 0.0 to 40.0 wt. % of a fluoropolymer selected from polyvinylidene fluoride (PVDF), polyvinylfluoride (PVF), polytetrafluorethylene (PTFE), polyethylenetetrafluoroethylene (ETFE), fluorinated ethylene-propylene (FEP) or a mixture or copolymer thereof;
from 0.0 to 5.0 wt. % of one or several UV-absorbers;
from 0.0 to 5.0 wt. % of one or several UV-stabilizers; and
from 0.0 to 20.0 wt. % of an adhesion-promoting copolymer comprising
(i) from 70.0 to 95.0 wt. % methyl methacrylate;
(ii) from 0.5 to 15.0 wt. % maleic anhydride; and
(iii) from 0.0 to 25.0 wt. % of other vinyl-copolymerizable monomers having no functional groups other than the vinyl function, based on the weight of the adhesion-promoting copolymer; and
wherein the cumulative content of the poly(methyl)methacrylate and of the one or several impact modifiers in the layer B is at least 50 wt. % based on the weight of the layer B.

2. The foil according to claim 1, wherein the layer A comprises:
from 85.0 to 97.0 wt. % of the fluoropolymer;
0.0 wt. % of the polyalkyl(meth)acrylate; and
from 3.0 to 15.0 wt. % of glass beads, based on the total weight of the layer A.

3. The foil according to claim 1, wherein the fluoropolymer is a predominantly amorphous polyvinylidene fluoride or a microcrystalline polyvinylidene fluoride.

4. The foil according to claim 1, wherein the glass beads are spherical and have an average diameter from 2.0 μm to 30.0 μm.

5. The foil according to claim 1, wherein the polyalkyl (meth)acrylate is polymethyl methacrylate having an average molar weight Mw of from 80 000 g/mol to 180 000 g/mol and is obtainable by polymerization of a composition whose polymerizable constituents comprise, based on the weight of the polymerisable composition:
(a) from 50.0 to 99.9 wt. % of methyl methacrylate,
(b) from 0.1 to 50.0 wt. % of an acrylic acid ester of a C1-C4 alcohol,
(c) from 0.0 to 10.0 wt. % of at least one further monomer copolymerizable with the monomers (a) and (b).

6. The foil according to claim 1, wherein at least 20 wt. % of the glass beads, based on the weight of the employed glass beads, have a diameter which is higher than an average thickness of the layer A.

7. The foil according to claim 1, wherein the layer B comprises:
from 0.5 to 4.0 wt. % of a benzotriazole type compound as a first UV absorber;
from 0.5 to 3.0 wt. % of a triazine type compound as a second UV absorber; and
from 0.2 to 2.0 wt. % of a HALS type compound as a UV stabilizer, based on the total weight of the layer B.

8. The foil according to claim 1, the foil further comprising an adhesion-promoting layer C, wherein
the layer B is located between the layer A and the layer C, and
the layer C comprises an adhesion-promoting copolymer comprising:
(i) from 70.0 to 95.0 wt. % methyl methacrylate;
(ii) from 0.5 to 15.0 wt. % maleic anhydride; and
(iii) from 0.0 to 25.0 wt. % of other vinyl-copolymerizable monomers having no functional groups other than the vinyl function, based on the weight of the adhesion-promoting copolymer.

9. The foil according to claim 1, wherein
the layer A has a thickness from 1.0 μm to 30.0 μm; and
the layer B has a thickness from 15.0 μm to 150.0 μm.

10. A process for the manufacturing of the foil according to claim 1, wherein the process comprises:
moulding the foil in a foil-moulding process from a composition comprising:
from 40.0 to 97.0 wt. % of a fluoropolymer;
from 0.0 to 45.0 wt. % of a polyalkyl(meth)acrylate; and
from 3.0 to 30.0 wt. % of glass beads, based on the total weight of the composition.

11. A multi-layer article, comprising a substrate which is at least partially covered by the foil according to claim 1, wherein
the layer A forms an outer surface of the multi-layer article;
the layer B is located between the layer A and the substrate; and
the layer C, if present, is located between the layer B and the substrate.

12. The multi-layer article according to claim 11, wherein
the layer B is adjacent to the layer A, and
the layer C, if present, is adjacent to the layer B.

13. A process for manufacturing of the multi-layer article according to claim 11, the process comprising:
coating the substrate with the foil according to claim 1 by co-extrusion, lamination or extrusion lamination.

14. The process according to claim 13, wherein the multi-layer article is a high-pressure laminate and the step of coating the substrate with the foil according to claim 1 is carried out at a pressure of not lower than 1 MPa and a temperature of not lower than 120° C.

15. The foil according to claim 2, wherein the fluoropolymer is of a molecular weight Mw from 50 000 to 300 000 g/mol, determined by GPC.

16. The foil according to claim 4, wherein the glass beads have an average diameter from 5.0 μm to 20.0 μm.

17. The foil according to claim 6, wherein at least 80 wt. % of the glass beads have a diameter which is higher than the average thickness of the layer A.

18. The process according to claim 10, wherein the foil-moulding process is a chill-roll process.

19. The multi-layer article according to claim 11, where the multi-layer article is a high-pressure laminate.

* * * * *